US012573353B2

(12) United States Patent
Shiraishi et al.

(10) Patent No.: US 12,573,353 B2
(45) Date of Patent: Mar. 10, 2026

(54) INFORMATION PROCESSING SYSTEM AND ADJUSTING METHOD

(71) Applicant: SONY GROUP CORPORATION, Tokyo (JP)

(72) Inventors: Toshihiro Shiraishi, Tokyo (JP); Hiroshi Kotera, Tokyo (JP); Takayuki Hotta, Tokyo (JP); Yukinori Hamada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/856,202

(22) PCT Filed: Mar. 30, 2023

(86) PCT No.: PCT/JP2023/013119
§ 371 (c)(1),
(2) Date: Oct. 11, 2024

(87) PCT Pub. No.: WO2023/203984
PCT Pub. Date: Oct. 26, 2023

(65) Prior Publication Data
US 2025/0246167 A1 Jul. 31, 2025

(30) Foreign Application Priority Data

Apr. 21, 2022 (JP) ................................. 2022-070297

(51) Int. Cl.
G09G 5/10 (2006.01)
G06V 10/60 (2022.01)
G09G 3/32 (2016.01)

(52) U.S. Cl.
CPC ............... G09G 5/10 (2013.01); G06V 10/60 (2022.01); G09G 3/32 (2013.01); G09G 2320/0626 (2013.01)

(58) Field of Classification Search
CPC .... G09G 5/10; G09G 3/32; G09G 2320/0626; G09G 3/20; G09G 5/00; G06V 10/60; H04N 5/66; H04N 17/04
See application file for complete search history.

(56) References Cited

U.S. PATENT DOCUMENTS

2022/0208076 A1* 6/2022 Shao ........................ G09G 3/32

FOREIGN PATENT DOCUMENTS

CN 106373522 A 2/2017
CN 112289209 A 1/2021
(Continued)

OTHER PUBLICATIONS

International Search Report and Written Opinion of PCT Application No. PCT/JP2023/013119, issued on May 30, 2023, 12 pages of ISRWO.

*Primary Examiner* — Antonio Xavier
(74) *Attorney, Agent, or Firm* — CHIP LAW GROUP

(57) ABSTRACT

The present disclosure relates to an information processing device, an adjusting method, and a program that can display a higher-quality image.
On the basis of an image obtained by imaging an LED display device configured by arranging a plurality of LED modules in a shape of tiles, a contrast measurement unit measures brightness of a joint area including a boundary between adjacent LED modules in the LED display device and a background area outside the joint area, and measures a contrast of the joint area to the background area. A joint correction value calculation unit calculates a joint correction value for adjusting luminance at the boundary between the LED modules on the basis of a measurement result of the contrast. The present technology can be applied to, for example, a direct view type tiling type large display using an LED.

19 Claims, 31 Drawing Sheets

(56) References Cited

FOREIGN PATENT DOCUMENTS

| | | | |
|---|---|---|---|
| CN | 112419966 | A | 2/2021 |
| CN | 112700753 | A | 4/2021 |
| CN | 114283742 | A | 4/2022 |
| JP | 2014-095793 | A | 5/2014 |
| KR | 10-2007-0019461 | A | 2/2007 |
| WO | 2018/164105 | A1 | 9/2018 |

\* cited by examiner

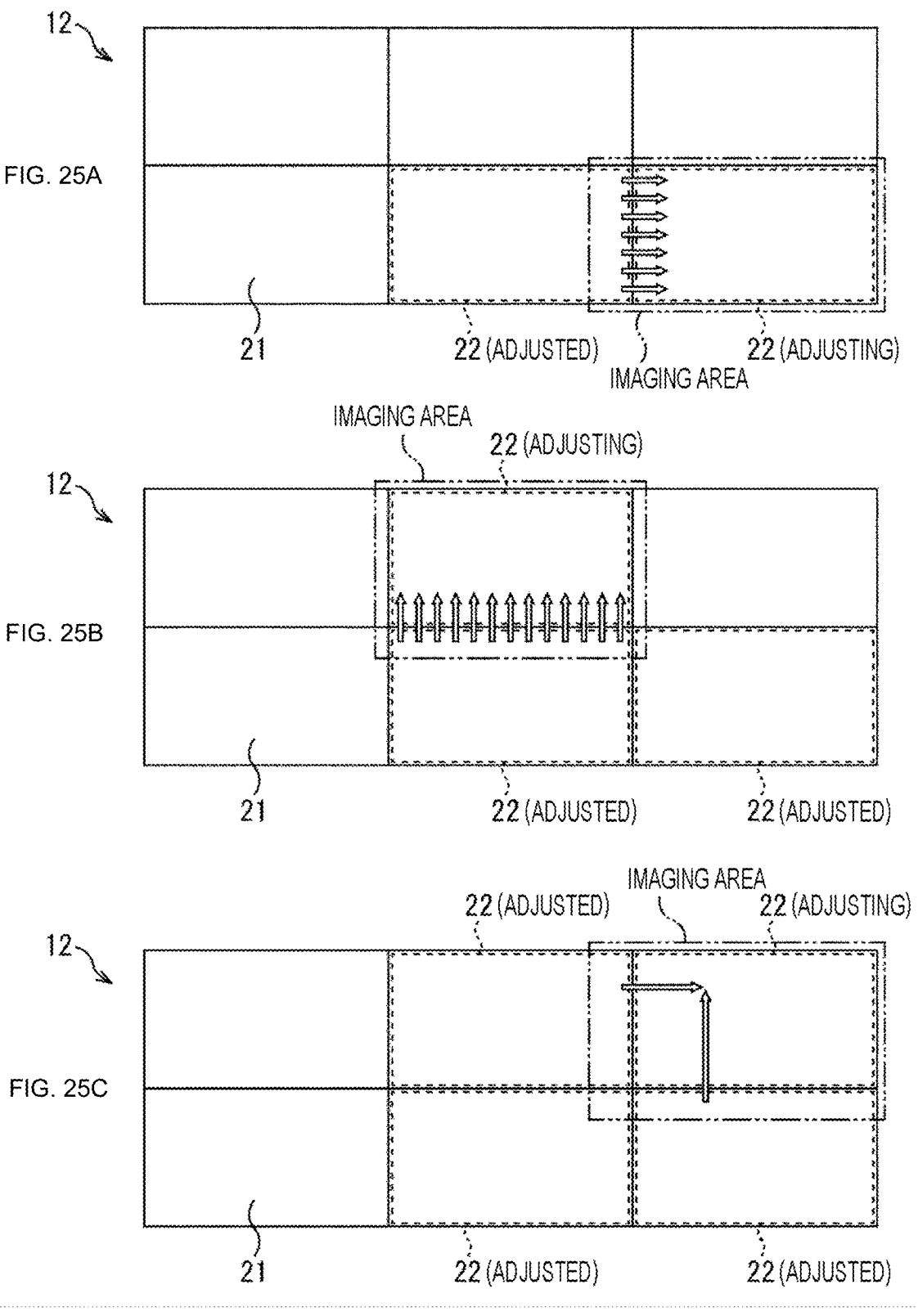

INFORMATION PROCESSING SYSTEM AND ADJUSTING METHOD

CROSS REFERENCE TO RELATED APPLICATIONS

This application is a U.S. National Phase of International Patent Application No. PCT/JP2023/013119 filed on Mar. 30, 2023, which claims priority benefit of Japanese Patent Application No. JP 2022-070297 filed in the Japan Patent Office on Apr. 21, 2022. Each of the above-referenced applications is hereby incorporated herein by reference in its entirety.

TECHNICAL FIELD

The present disclosure relates to an information processing system, an adjusting method, and a program, and especially relates to an information processing system, an adjusting method, and a program capable of displaying a higher-quality image.

BACKGROUND ART

In recent years, a market for a direct view type and tiling type large display using a light emitting diode (LED) has expanded, and installation of a large LED display for the purpose of more faithful image expression has progressed. For example, in the movie industry and the like, a large LED display in which a plurality of LED modules is arranged in a shape of tiles is increasingly used as a background in a virtual studio.

For example, Patent Document 1 discloses a driving device capable of suppressing occurrence of band-shaped luminance unevenness of an image obtained by imaging in a case where an LED display is imaged by a camera.

CITATION LIST

Patent Document

Patent Document 1: WO 2018/164105 A

SUMMARY OF THE INVENTION

Problems to be Solved by the Invention

By the way, in the tiling type large LED display as described above, it is possible to display a high-quality image by performing an adjustment work for making joints between the LED modules inconspicuous and an adjustment work for implementing uniformity as an entire image. However, conventionally, since the adjustment work is performed by a worker visually and manually while changing luminance one by one between the LED modules, there is a concern that not only a work time becomes long but also finishing varies depending on the skill of the worker. Therefore, it is required to be able to display a high-quality image in a shorter time and while avoiding variations in finish among workers by automating these adjustment works.

The present disclosure has been made in view of such circumstances and an object thereof is to display a higher-quality image.

Solutions to Problems

An information processing system according to one aspect of the present disclosure includes a contrast measurement unit that measures, on the basis of an image obtained by imaging an LED display device configured by arranging a plurality of LED modules in a shape of tiles, brightness of a joint area including a boundary between the LED modules adjacent to each other and a background area outside the joint area in the LED display device, and measures contrast of the joint area with respect to the background area, and a joint correction value calculation unit that calculates a joint correction value for adjusting luminance at a boundary between the LED modules on the basis of a measurement result of the contrast.

In an adjusting method according to one aspect of the present disclosure, an information processing system performs processing including measuring, on the basis of an image obtained by imaging an LED display device configured by arranging a plurality of LED modules in a shape of tiles, brightness of a joint area including a boundary between the LED modules adjacent to each other and a background area outside the joint area in the LED display device, and measuring a contrast of the joint area to the background area, and calculating a joint correction value for adjusting luminance at the boundary between the LED modules on the basis of a measurement result of the contrast.

A program according to one aspect of the present disclosure allows a computer of an information processing system to execute processing including measuring, on the basis of an image obtained by imaging an LED display device configured by arranging a plurality of LED modules in a shape of tiles, brightness of a joint area including a boundary between the LED modules adjacent to each other and a background area outside the joint area in the LED display device, and measuring a contrast of the joint area to the background area, and calculating a joint correction value for adjusting luminance at the boundary between the LED modules on the basis of a measurement result of the contrast.

In one aspect of the present disclosure, on the basis of an image obtained by imaging an LED display device configured by arranging a plurality of LED modules in a shape of tiles, brightness of a joint area including a boundary between the LED modules adjacent to each other and a background area outside the joint area in the LED display device is measured, a contrast of the joint area to the background area is measured, and a joint correction value for adjusting luminance at the boundary between the LED modules is calculated on the basis of a measurement result of the contrast.

BRIEF DESCRIPTION OF DRAWINGS

FIG. 3 is a diagram illustrating an adjustment target range and a measuring marker.

FIG. 4 is a view illustrating a display example of a camera positioning processing screen.

FIG. 6 is a diagram illustrating a fact that a joint is conspicuous in an LED display device.

FIG. 7 is a diagram illustrating detection of joint coordinates.

FIG. 8 is a diagram illustrating detection of a measurement area.

FIG. 10 is a diagram illustrating a signal level at which a contrast is zero.

FIG. 11 is a view illustrating a display example of a joint adjustment processing screen in an NG state.

FIG. 12 is a view illustrating a display example of a joint adjustment processing screen in an OK state.

FIG. 23 is a diagram illustrating overlap imaging.

FIGS. 25A, 25B, and 25C are diagrams illustrating uniformity adjustment processing on an adjusting adjustment target range performed with an adjusted adjustment target range as a reference.

FIG. 27 is a diagram illustrating curve information of the LED display device in a round shape.

MODE FOR CARRYING OUT THE INVENTION

Hereinafter, a specific embodiment to which the present technology is applied will be described in detail with reference to the drawings.

<Configuration Example of Display System>

Figure 1:
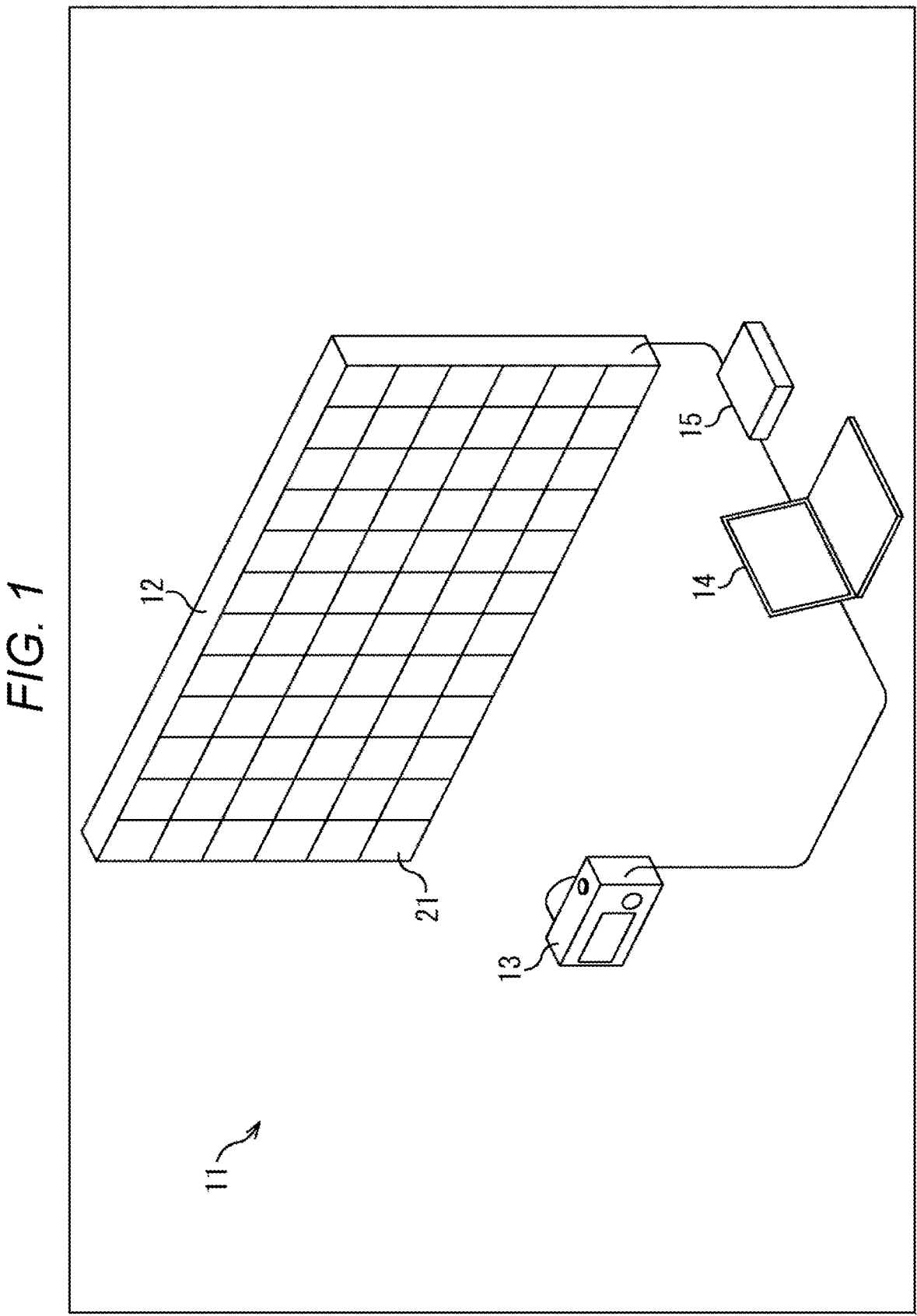
FIG. 1 is a diagram illustrating a configuration example of one embodiment of a display system to which the present technology is applied.

FIG. 1 is a diagram illustrating a configuration example of one embodiment of a display system to which the present technology is applied.

As illustrated in FIG. 1, a display system 11 includes an LED display device 12, a camera 13, an information processing device 14, and a display controller 15.

The LED display device 12 is configured by arranging a plurality of LED modules 21 in a shape of tiles, and the LED modules 21 can display an image up to an edge of a surface. Therefore, the LED display device 12 can display an image in which a physical joint does not appear at a boundary between the LED modules 21 on an entire LED display device 12 by installing the adjacent LED modules 21 without a gap therebetween.

Here, in the display system 11, as will be described with reference to FIG. 6 to be described later, the joint is sometimes conspicuous due to high or low luminance at the boundary between the LED modules 21. Therefore, in the display system 11, processing of adjusting luminance (hereinafter, referred to as a joint adjustment processing unit) is performed in order to avoid the joint of the LED display device 12 from being conspicuous. Furthermore, in the display system 11, processing of adjusting luminance (hereinafter, referred to as uniformity adjustment processing) is performed in order to display an image having uniformity as the entire LED display device 12.

The camera 13 is installed in front of the LED display device 12, and images the LED display device 12 under control of the information processing device 14 when the joint adjustment processing unit and the uniformity adjustment processing are performed.

The information processing device 14 can use a personal computer, for example, and executes adjusting software for performing the joint adjustment processing and the uniformity adjustment processing on the LED display device 12 using an image of the LED display device 12 imaged by the camera 13. Then, the information processing device 14 outputs various instructions, commands, setting values and the like to the display controller 15. Note that, the information processing device 14 may also serve a personal computer that executes control software for performing control on the display controller 15, or a personal computer for executing the control software may be prepared in addition to the information processing device 14.

For example, the display controller 15 divides video signals in units of frames supplied from a video server not illustrated according to positions of the plurality of LED modules 21 included in the LED display device 12, and performs light emission control on each LED module 21. Furthermore, for example, the display controller 15 performs light emission control of a measurement area 26 (FIG. 8), a marker 29 (FIGS. 14A, 14B, and 14C) and the like according to an instruction from the information processing device 14, and supplies a setting value and the like to the LED display device 12. Note that, the display controller 15 may be incorporated in (integrated with) the LED display device 12 to form the display system 11.

The display system 11 is configured as described above, and when the LED display device 12 is installed or the LED module 21 is maintained and replaced, a worker who performs these works can execute the joint adjustment processing unit and the uniformity adjustment processing. Therefore, the display system 11 can display a higher-quality image on the LED display device 12.

Figure 2:
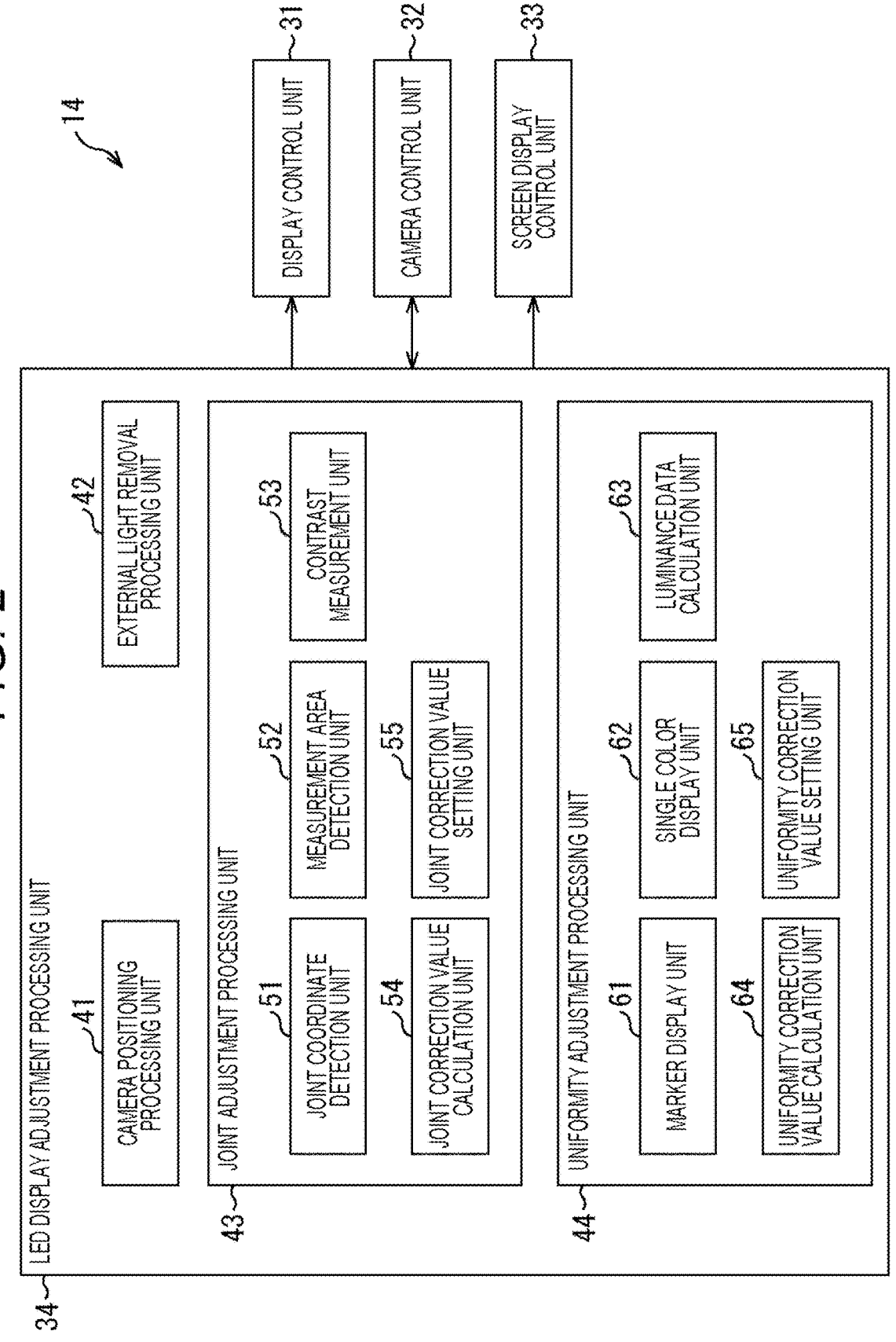
FIG. 2 is a block diagram illustrating a configuration example of an LED display adjustment processing unit.

FIG. 2 is a block diagram illustrating a configuration example of the information processing device 14.

As illustrated in FIG. 2, the information processing device 14 includes a display control unit 31, a camera control unit 32, a screen display control unit 33, and an LED display adjustment processing unit 34.

The display control unit 31 can perform control regarding display of the LED display device 12 according to an instruction from the LED display adjustment processing unit 34.

The camera control unit 32 controls imaging by the camera 13 according to an instruction from the LED display adjustment processing unit 34, acquires an image of the LED display device 12 imaged by the camera 13, and supplies the same to the LED display adjustment processing unit 34.

The screen display control unit 33 controls display of a screen on a display unit of the information processing device 14 according to an instruction from the LED display adjustment processing unit 34. For example, the screen display control unit 33 controls display of a camera positioning processing screen 71 illustrated in FIG. 4 to be described later, a joint adjustment processing screen 81 illustrated in FIGS. 11 and 12 to be described later, a uniformity adjustment processing screen 91 illustrated in FIGS. 15 to 18 to be described later and the like.

The LED display adjustment processing unit 34 includes a camera positioning processing unit 41, an external light removal processing unit 42, a joint adjustment processing unit 43, and a uniformity adjustment processing unit 44.

Figure 3:
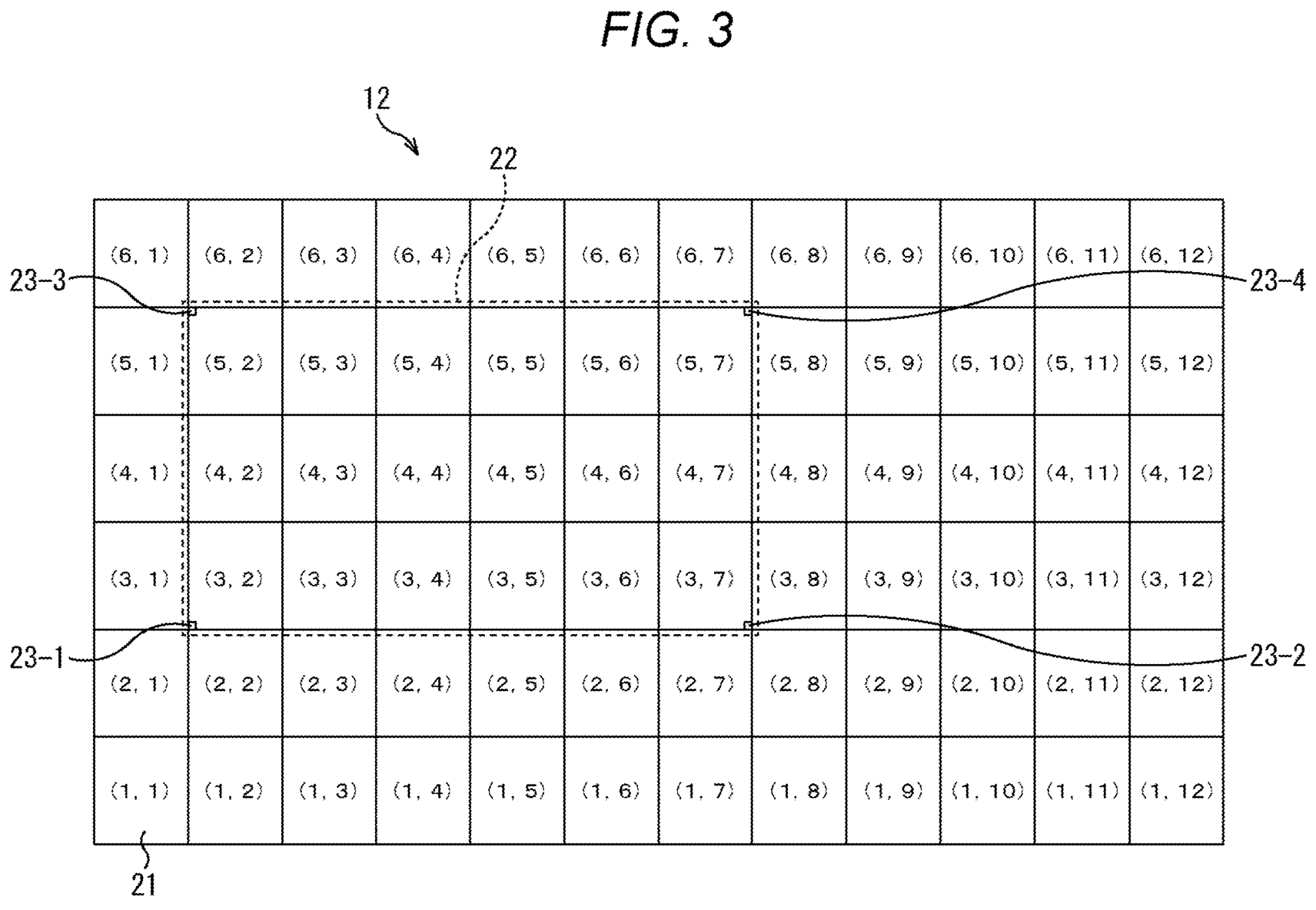

The camera positioning processing unit 41 performs camera positioning processing for accurately installing the camera 13 in a position in front of the LED display device 12 and at the center of an adjustment target range 22 (FIG. 3).

The external light removal processing unit 42 performs external light removal processing for removing an influence of external light when the LED display device 12 is imaged by the camera 13.

The joint adjustment processing unit 43 performs joint adjustment processing on the basis of the image obtained by imaging the LED display device 12, and includes a joint coordinate detection unit 51, a measurement area detection unit 52, a contrast measurement unit 53, a joint correction value calculation unit 54, and a joint correction value setting unit 55.

In the joint adjustment processing, the joint coordinate detection unit 51 detects joint coordinates on the image obtained by imaging the LED display device 12 by the camera 13.

In the joint adjustment processing, the measurement area detection unit 52 detects the measurement area 26 (FIG. 8) on the image obtained by imaging the LED display device 12 by the camera 13.

In the joint adjustment processing, the contrast measurement unit 53 measures brightness of each of a joint area 27 (FIG. 9) and a background area 28 (FIG. 9) of the measurement area 26 on the image obtained by imaging the LED display device 12 by the camera 13, and measures a contrast of the joint area 27 to the background area 28.

In the joint adjustment processing, the joint correction value calculation unit 54 calculates a joint correction value on the basis of a measurement result of the contrast of the measurement area 26 by the contrast measurement unit 53.

In the joint adjustment processing, the joint correction value setting unit 55 writes the joint correction value appropriately obtained by the joint correction value calculation unit 54 in a storage unit of the LED display device 12, for example, in a register or a rewritable nonvolatile memory, and sets the joint correction value.

The uniformity adjustment processing unit 44 performs the uniformity adjustment processing on the basis of the image obtained by imaging the LED display device 12, and includes a marker display unit 61, a single color display unit 62, a luminance data calculation unit 63, a uniformity correction value calculation unit 64, and a uniformity correction value setting unit 65.

In the uniformity adjustment processing, the marker display unit 61 detects the marker 29 (FIGS. 14A, 14B, and 14C) on the image obtained by imaging the LED display device 12 by the camera 13.

In the uniformity adjustment processing, the single color display unit 62 allows the LED display device 12 to display a red single color image, a green single color image, and a blue single color image, acquires three images obtained by imaging the LED display device 12 that displays the single color images, and supplies the same to the luminance data calculation unit 63. Each LED element included in the LED display device 12 can express various colors by adjusting luminance of a plurality of light emission colors (for example, three primary colors of red, green, and blue), and the single color display unit 62 allows the LED display device 12 to display the single color images corresponding to the light emission colors.

In the uniformity adjustment processing, the luminance data calculation unit 63 calculates luminance data of an area of the marker 29 in the three images obtained by imaging the LED display device 12 that displays the red single color image, the green single color image, and the blue single color image.

In the uniformity adjustment processing, the uniformity correction value calculation unit 64 calculates a uniformity correction value for each color by comparing reference luminance data for each color with the luminance data for each color calculated by the luminance data calculation unit 63.

In the uniformity adjustment processing, the uniformity correction value setting unit 65 writes the uniformity correction value for each color appropriately obtained by the uniformity correction value calculation unit 64 in the register or the rewritable nonvolatile memory of the LED display device 12, and sets the uniformity correction value for each color.

<Processing Example of Camera Positioning Processing>

An example of camera positioning processing will be described with reference to FIGS. 3 and 4.

In the display system 11, when the joint adjustment processing and the uniformity adjustment processing are performed using the image imaged by the camera 13, it is necessary to accurately install the camera 13 at the center of the LED module 21 to be the adjustment target range of the LED display device 12. For example, in the display system 11, the entire LED display device 12, that is, all the LED modules 21 can be set as the adjustment target range, and any optional number of LED modules 21 can be set as the adjustment target range.

In the example illustrated in FIG. 3, the LED display device 12 includes LED modules 21(1,1) to 21(6,12) arranged in a shape of 6×12 (height×width) tiles, and a range surrounded by a broken line is set as the adjustment target range 22. That is, in the example illustrated in FIG. 3, 3×6 array LED modules 21(3,2) to 21(3,7), LED modules 21(4,2) to 21(4,7), and LED modules 21(5,2) to 21(5,7) are set as the adjustment target range 22.

For example, the worker temporarily installs the camera 13 in a position in front of the LED display device 12 and at the center of the adjustment target range 22. Then, when the worker operates the information processing device 14 to designate the adjustment target range 22, the camera positioning processing unit 41 accepts the designation of the adjustment target range 22 and executes the camera positioning processing on the basis of the designated adjustment target range 22.

First, the camera positioning processing unit 41 instructs the display control unit 31 to display markers 23-1 to 23-4 for positioning at four corners of the adjustment target range 22. Therefore, the display control unit 31 performs control on the LED display device 12 so as to display the marker 23-1 for positioning at a lower left corner of the LED module 21(3,2), display the marker 23-2 for positioning at a lower right corner of the LED module 21(3,7), display the marker 23-3 for positioning at an upper left corner of the LED module 21(5,2), and display the marker 23-4 for positioning at an upper right corner of the LED module 21(5,7).

Then, the camera positioning processing unit 41 instructs the camera control unit 32 to allow the camera 13 to image the LED display device 12, and the camera control unit 32 controls the camera 13. When the camera 13 acquires the image obtained by imaging the LED display device 12 in response to this, the camera control unit 32 acquires the image and supplies the same to the camera positioning processing unit 41. Therefore, the camera positioning processing unit 41 can acquire position coordinate data of the markers 23-1 to 23-4 for positioning on the image imaged by the camera 13.

Figure 4:
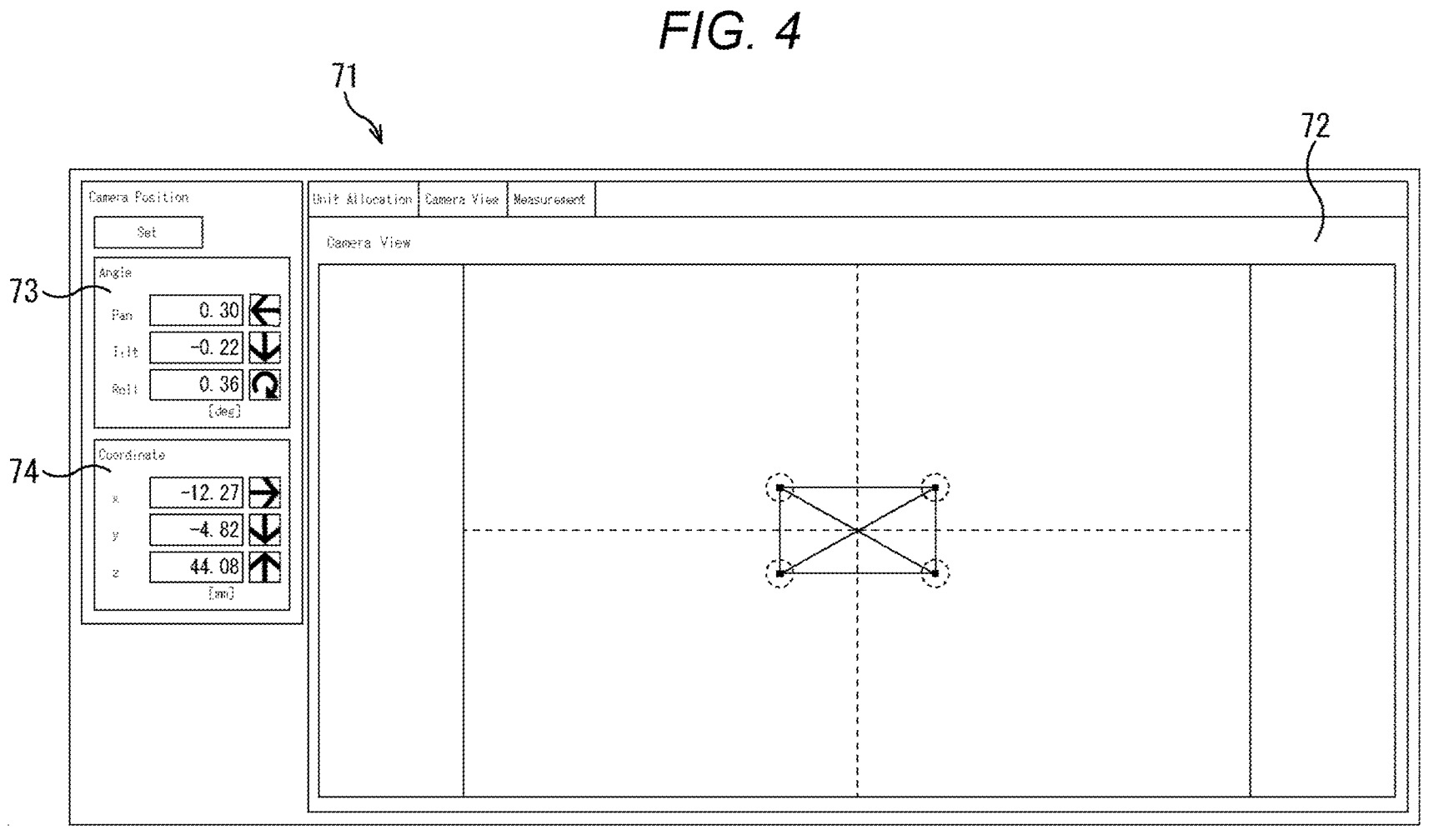

Moreover, the camera positioning processing unit 41 instructs the screen display control unit 33 to display the camera positioning processing screen 71 as illustrated in FIG. 4, and the screen display control unit 33 controls the display of the display unit of the information processing device 14.

As illustrated in FIG. 4, the camera positioning processing screen 71 is provided with an image display area 72, an angle adjustment display area 73, and a position adjustment display area 74.

The image obtained by imaging the LED display device 12 by the camera 13, that is, the image of the LED display device 12 displaying the markers 23-1 to 23-4 for positioning at the four corners of the adjustment target range 22 is displayed in the image display area 72. In the example illustrated in FIG. 4, positions of the markers 23-1 to 23-4 for positioning on the image imaged by the camera 13 are indicated in the image display area 72.

Angle adjustment amounts for adjusting angles (pan, tilt, roll) of the camera 13 in order to match the markers 23-1 to 23-4 for positioning on the image with reference position coordinate data of target markers are indicated in the angle adjustment display area 73. Furthermore, next to each angle adjustment amount, an icon for allowing the worker to easily grasp a direction of in which the camera 13 is moved according to the angle adjustment amount is displayed.

Position adjustment amounts for adjusting the position (X direction, Y direction, Z direction) of the camera 13 in order to match the markers 23-1 to 23-4 for positioning on the image with the reference position coordinate data of the target markers are indicated in the position adjustment display area 74. Furthermore, next to each position adjustment amount, an icon for allowing the worker to easily grasp the direction in which the camera 13 is moved according to the position adjustment amount is displayed.

Here, since the image actually imaged by the camera 13 is distorted in a barrel shape due to lens distortion (lens distortion aberration), it is difficult to obtain target marker positions on the image by calculation. Therefore, in the display system 11, four corners of each LED module 21 are set as the target marker positions, and it is simulated in which positions on the image actually imaged by the camera 13 the reference position coordinate data thereof appear. That is, in a state in which the four corners of each LED module 21 are turned on, imaging is actually performed by the camera 13. Therefore, the camera positioning processing unit 41 can acquire in advance as reference information, the reference position coordinate data of the target markers on the image imaged in a state in which the four corners of each LED module 21 are turned on.

Therefore, the camera positioning processing unit 41 can obtain the angle adjustment amounts and position adjustment amounts by comparing the reference position coordinate data corresponding to the markers 23-1 to 23-4 for positioning in the reference information with the position coordinate data of the markers 23-1 to 23-4 for positioning in the image acquired by the camera positioning processing and calculating a deviation between them.

Therefore, the worker can adjust the angle and position of the camera 13 according to the angle adjustment amounts displayed in the angle adjustment display area 73 and the position adjustment amounts displayed in the position adjustment display area 74, thereby accurately installing the camera 13 in the position in front of the LED display device 12 and at the center of the adjustment target range 22.

<Processing Example of External Light Removal Processing>

One example of the external light removal processing will be described with reference to FIGS. 5A, 5B, 5C, and 5D.

Figures 5A, 5B, 5C, 5D:
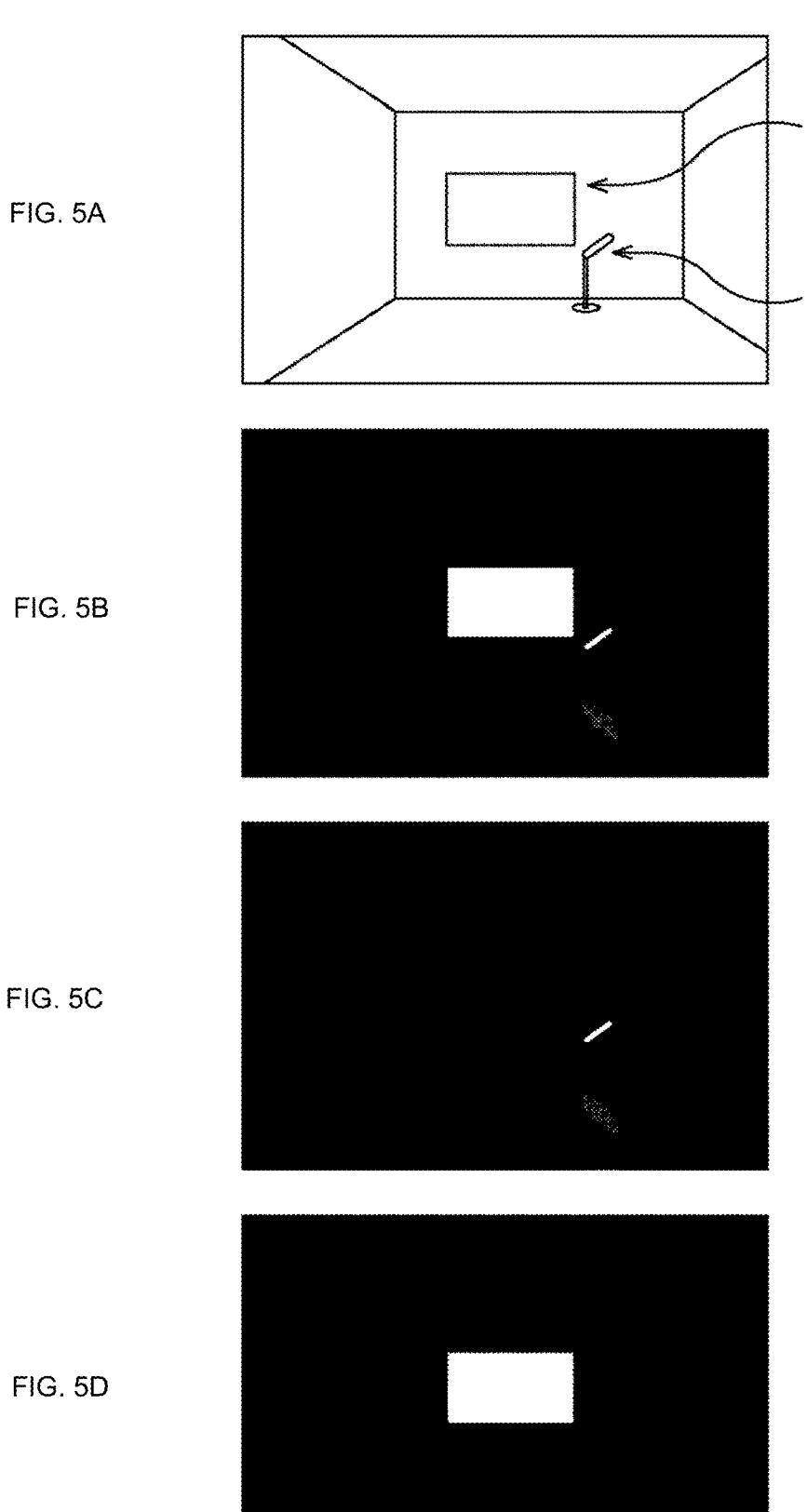
FIGS. 5A, 5B, 5C, and 5D are diagrams illustrating external light removal processing.

For example, as illustrated in FIG. 5A, in a case where an illumination device 16 is provided in a room in which the LED display device 12 is arranged, illumination light of the illumination device 16 and reflected light of the illumination light reflected by a floor or the like sometimes appears as unnecessary external light in the image imaged by the camera 13. Therefore, in the display system 11, the external light removal processing by the external light removal processing unit 42 is required in order to avoid such external light from adversely affecting the joint adjustment processing unit and the uniformity adjustment processing.

First, as illustrated in FIG. 5B, the external light removal processing unit 42 instructs the camera control unit 32 to allow the camera 13 to image the LED display device 12 in a state in which the illumination other than the illumination device 16 is turned off and a white image is displayed in the adjustment target range 22 of the LED display device 12. Note that, FIG. 5B illustrates a state in which the white image is displayed on an entire surface of the LED display device 12.

Next, as illustrated in FIG. 5C, the external light removal processing unit 42 instructs the camera control unit 32 to allow the camera 13 to image the LED display device 12 in a state in which a black image is displayed on the entire surface of the LED display device 12 while keeping the illumination other than the illumination device 16 turned off. When the camera control unit 32 performs control on the camera 13 in response to this, the camera 13 images the LED display device 12 in which the white image is displayed in the adjustment target range 22, and images the LED display device 12 in which the black image is displayed on the entire surface. Then, the camera control unit 32 acquires the two images and supplies the same to the external light removal processing unit 42.

Therefore, the external light removal processing unit 42 can perform an arithmetic operation of subtracting the image imaged in a state of displaying the black image from the image imaged in a state of displaying the white image, thereby acquiring an image in which only the white image of the LED display device 12 remains as illustrated in FIG. 5D.

Then, the external light removal processing unit 42 limits an area corresponding to the white image of the LED display device 12 on this image as a processing target range when the joint adjustment processing and the uniformity adjustment processing are performed. Therefore, even in a case where the illumination device 16 is arranged in an imaging range imaged by the camera 13, it is possible to remove an influence of the illumination device 16 and perform the joint adjustment processing and the uniformity adjustment processing.

Note that, the external light removal processing can be performed by displaying an image of a predetermined color other than black in addition to displaying the white image in the adjustment target range 22. Furthermore, in the external light removal processing, in addition to displaying the black image on the entire surface of the LED display device 12, the entire surface of the LED display device 12 may be turned off.

<Processing Example of Joint Adjustment Processing>

One example of the joint adjustment processing will be described with reference to FIGS. 6 to 13.

First, with reference to FIG. 6, a fact that the joint is conspicuous in the LED display device 12 will be described.

Figure 6:
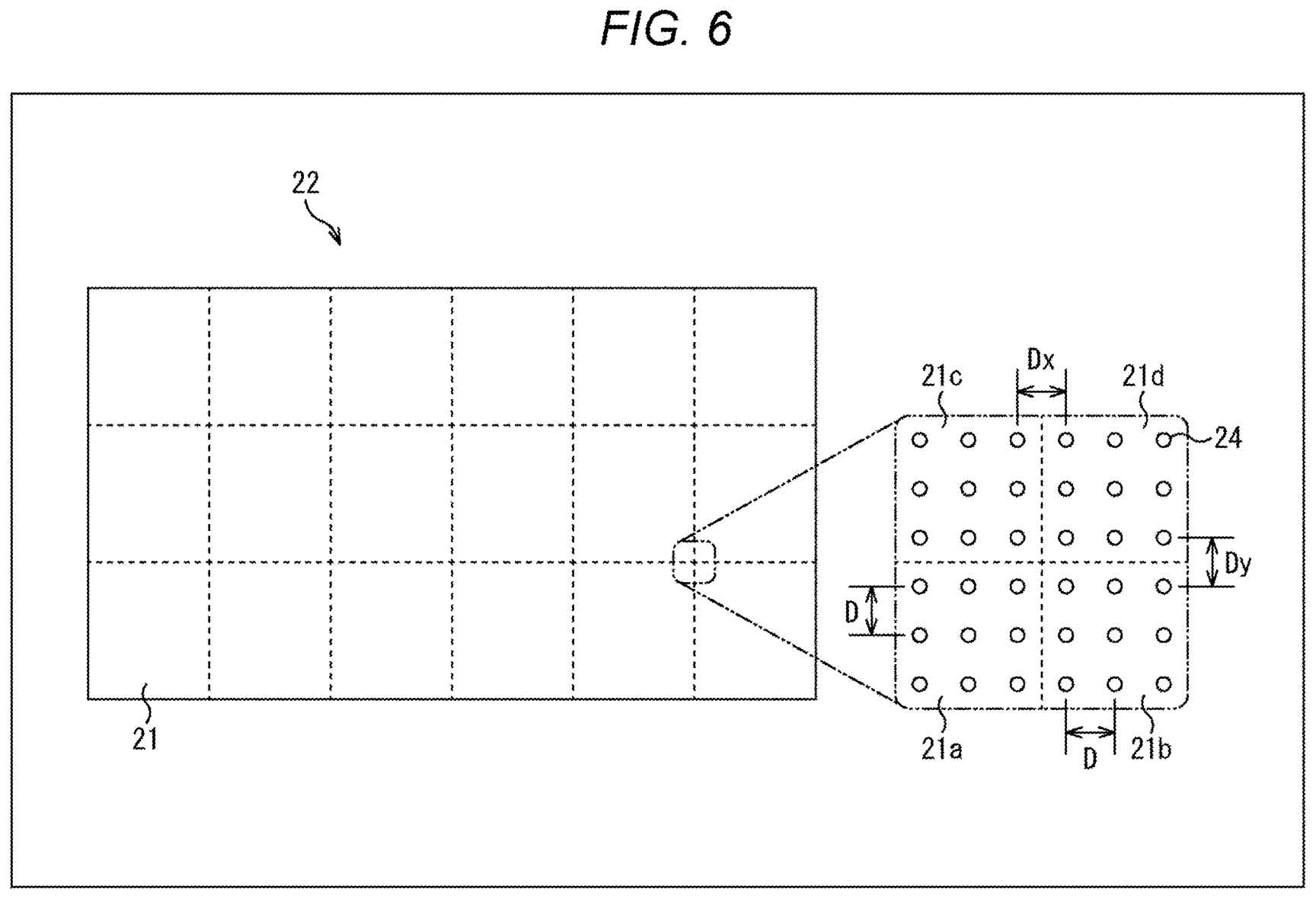

FIG. 6 illustrates the 3×6 array LED modules 21 set as the adjustment target range 22 as described with reference to FIG. 3. Furthermore, in FIG. 6, a boundary portion between four LED modules 21a to 21d arranged in 2×2 (height× width) is illustrated in an enlarged manner. Furthermore, in FIG. 6, the boundary between the LED modules 21 arranged adjacent to each other is indicated by a broken line.

For example, in the LED module 21, a plurality of LED pixels 24 is arranged in a matrix at regular intervals D in the X direction and the Y direction. Then, an outer shape of the LED module 21 is formed in such a manner that a boundary interval Dx between the LED pixels 24 arranged along the boundary of the LED modules 21 arranged adjacent to each other in a lateral direction and a boundary interval Dy between the LED pixels 24 arranged along the boundary of the LED modules 21 arranged adjacent to each other in a longitudinal direction coincide with the interval D. However, in practice, there is a case where the boundary interval Dx or the boundary interval Dy does not match the interval D at the time of installation of the LED display device 12 or maintenance replacement of the LED module 21 due to various errors and the like.

For example, in a case where the boundary interval Dx is narrower than the interval D, an area along the boundary between the LED modules 21 arranged adjacent to each other in the lateral direction has higher luminance than other areas, and as a result, the joint is conspicuous in the area along the boundary. In contrast, in a case where the boundary interval Dx is wider than the interval D, an area along the boundary between the LED modules 21 arranged adjacent to each other in the lateral direction has lower luminance than other areas, and as a result, the joint is conspicuous in the area along the boundary. Similarly, in a case where the boundary interval Dy is narrower than the interval D and in a case where the boundary interval Dy is wider than the interval D, the joint is conspicuous in the area along the boundary between the LED modules 21 arranged adjacent to each other in the longitudinal direction.

Therefore, in the display system 11, the joint adjustment processing unit 43 may perform the joint adjustment processing, thereby adjusting the luminance so as to prevent the joint from being conspicuous at the boundary between the LED modules 21 arranged adjacent to each other.

First, in the joint adjustment processing, the joint coordinate detection unit 51 detects the joint coordinates in the LED display device 12 on the image imaged by the camera 13.

Figure 7:
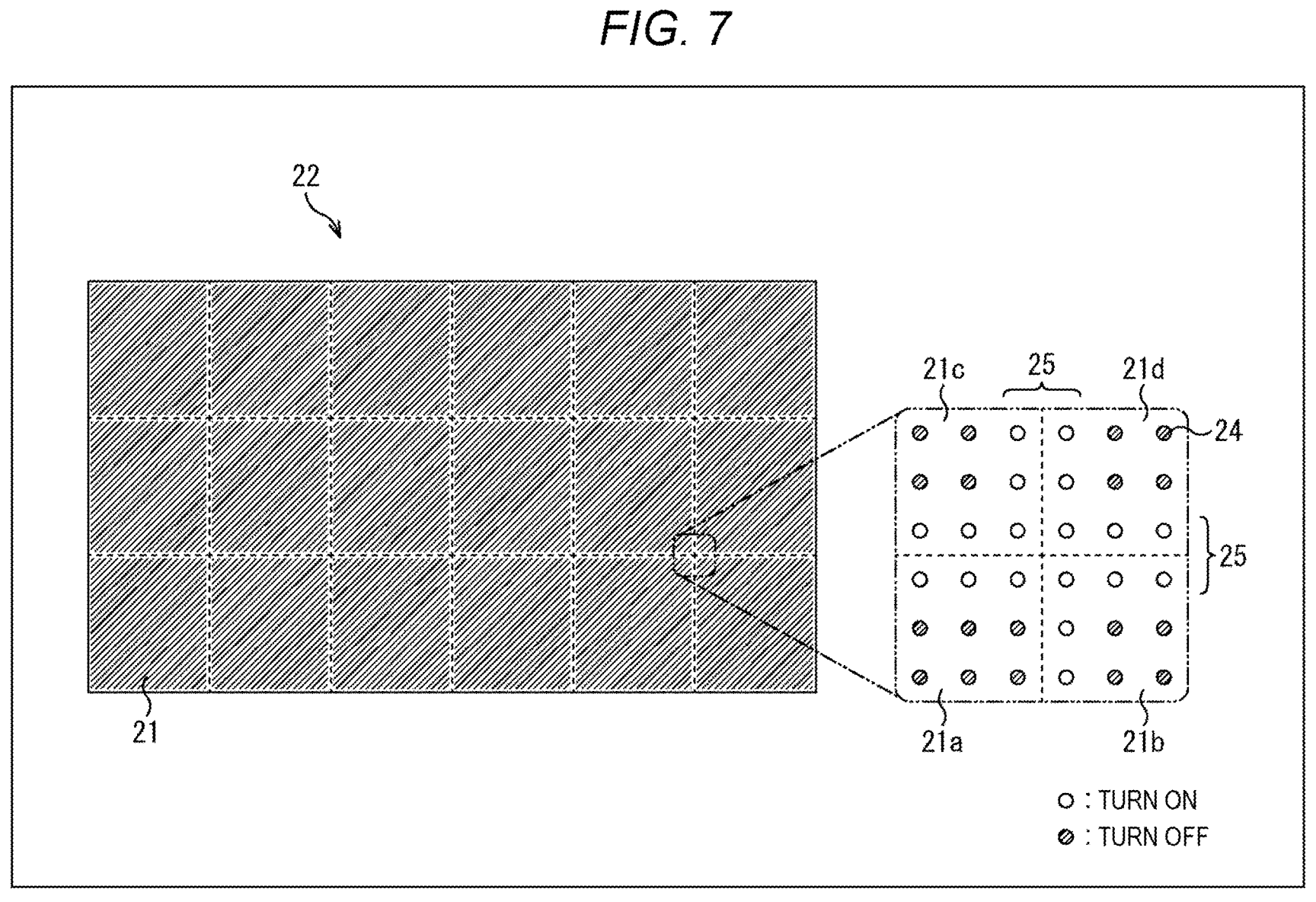

Similarly to FIG. 6, FIG. 7 illustrates the 3×6 array LED modules 21 set as the adjustment target range 22, and illustrates in an enlarged manner the boundary portion between the four LED modules 21a to 21d arranged in 2×2 (height×width).

For example, the joint coordinate detection unit 51 instructs the display control unit 31 to allow, out of the plurality of LED pixels 24 arranged in a matrix, the LED pixels 24 in two rows and two columns arranged across the boundaries between the LED modules 21 are turned on in white, and the other LED pixels 24 are turned off as illustrated in FIG. 7. Here, an area in which the LED pixels 24 in two rows and two columns arranged across the boundaries between the LED modules 21 are provided is hereinafter referred to as a hatch area 25. When the display control unit 31 performs control on the LED display device 12 in response to this, the LED display device 12 turns on the LED pixels 24 in the hatch area 25 in white, and turns off the other LED pixels 24.

Then, the joint coordinate detection unit 51 instructs the camera control unit 32 to allow the camera 13 to image the LED display device 12. When the camera control unit 32 performs control on the camera 13 in response to this, the camera 13 images the LED display device 12 in a state in which the LED pixels 24 in the hatch area 25 are turned on in white. Therefore, the camera control unit 32 acquires the image and supplies the same to the joint coordinate detection unit 51.

Therefore, the joint coordinate detection unit 51 can detect the joint coordinates in the LED display device 12 on the image on the basis of the image obtained by imaging the LED display device 12 in a state in which the LED pixels 24 in the hatch area 25 are turned on in white. Then, the joint coordinate detection unit 51 notifies the contrast measurement unit 53 of the joint coordinates in the LED display device 12 on the image imaged by the camera 13.

Next, in the joint adjustment processing, the measurement area detection unit 52 detects the measurement area in the LED display device 12 on the image imaged by the camera 13.

Figure 8:
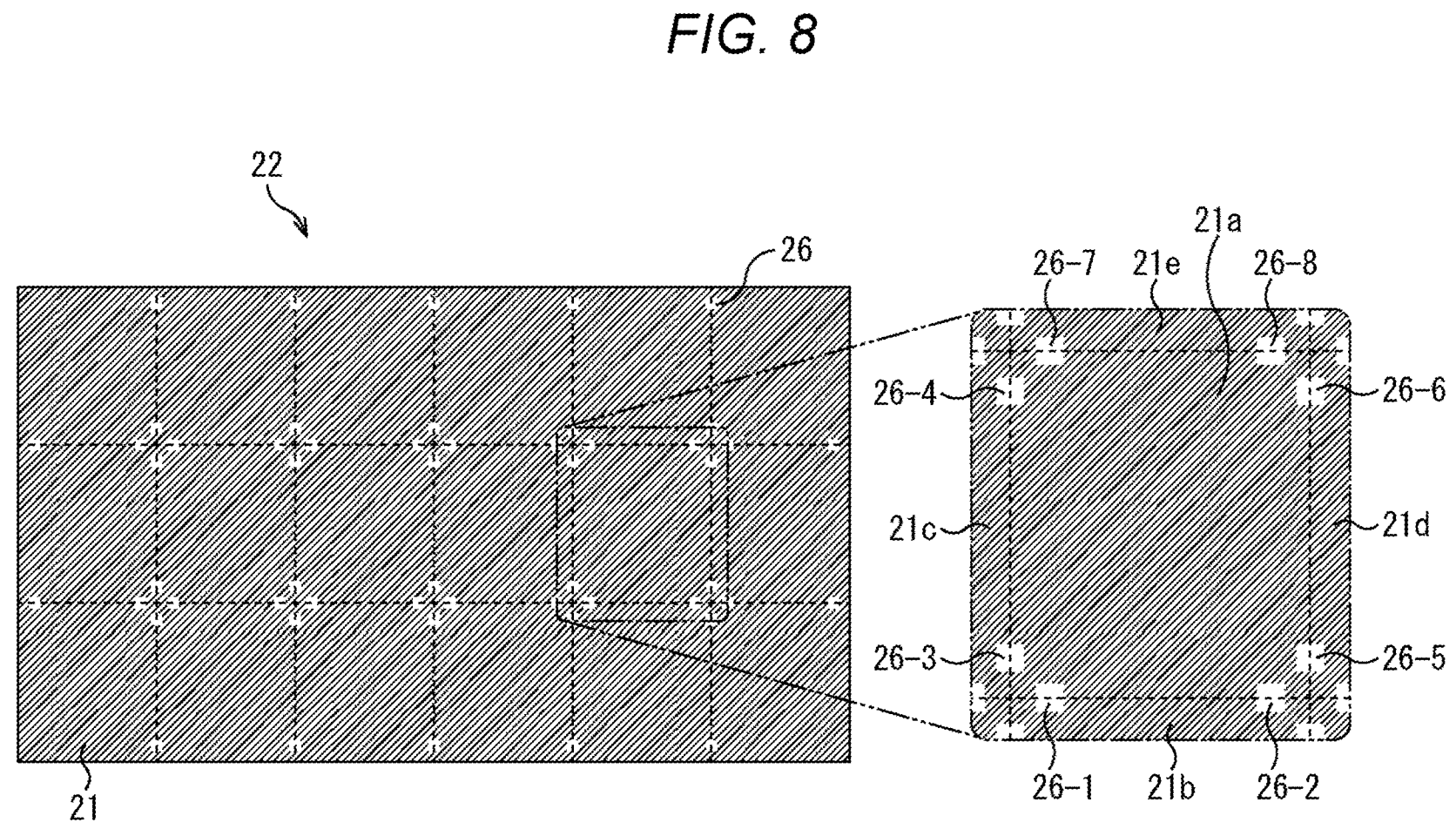

Similarly to FIG. 6, FIG. 8 illustrates the 3×6 array LED modules 21 set as the adjustment target range 22. Furthermore, in FIG. 8, centered on the LED module 21a, a part of the LED module 21b arranged on a lower side, a part of the LED module 21c arranged on a left side, a part of the LED module 21d arranged on a right side, and a part of the LED module 21e arranged on an upper side are illustrated in an enlarged manner.

For example, as illustrated in FIG. 8, the measurement area detection unit 52 instructs the display control unit 31 to allow the LED pixels 24 in the measurement area 26 to be turned on in white and the LED pixels 24 in other than the measurement area 26 to be turned off, the measurement area 26 being provided in the vicinity of both ends of the boundary between the LED modules 21 arranged adjacent to each other. When the display control unit 31 performs control on the LED display device 12 in response to this, the LED display device 12 turns on the LED pixels 24 in the measurement area 26 in white, and turns off the LED pixels 24 in other than the measurement area 26.

Then, the measurement area detection unit 52 instructs the camera control unit 32 to allow the camera 13 to image the LED display device 12. When the camera control unit 32 performs control on the camera 13 in response to this, the camera 13 images the LED display device 12 in a state in which the LED pixels 24 in the measurement area 26 are turned on in white. Therefore, the camera control unit 32 acquires the image and supplies the same to the measurement area detection unit 52.

Therefore, the measurement area detection unit 52 can detect the measurement area 26 in the LED display device 12 on the image on the basis of the image obtained by imaging the LED display device 12 in a state in which the LED pixels 24 in the measurement area 26 are turned on in white. Then, the measurement area detection unit 52 notifies the contrast measurement unit 53 of the measurement area 26 in the LED display device 12 on the image imaged by the camera 13.

In the example illustrated in FIG. 8, a measurement area 26-1 is provided in the vicinity of a left end of the boundary between the LED module 21*a* and the LED module 21*b*, and a measurement area 26-2 is provided in the vicinity of a right end of the boundary between the LED module 21*a* and the LED module 21*b*. Therefore, in the measurement area 26-1 and the measurement area 26-2, the contrast for obtaining the joint correction value at the boundary between the LED module 21*a* and the LED module 21*b* is measured. Furthermore, a measurement area 26-3 is provided in the vicinity of a lower end of the boundary between the LED module 21*a* and the LED module 21*c*, and a measurement area 26-4 is provided in the vicinity of an upper end of the boundary between the LED module 21*a* and the LED module 21*c*. Therefore, in the measurement area 26-3 and the measurement area 26-4, the contrast for obtaining the joint correction value at the boundary between the LED module 21*a* and the LED module 21*c* is measured.

Similarly, a measurement area 26-5 is provided in the vicinity of a lower end of the boundary between the LED module 21*a* and the LED module 21*d*, and a measurement area 26-6 is provided in the vicinity of an upper end of the boundary between the LED module 21*a* and the LED module 21*d*. Therefore, in the measurement area 26-5 and the measurement area 26-6, the contrast for obtaining the joint correction value at the boundary between the LED module 21*a* and the LED module 21*d* is measured. Furthermore, a measurement area 26-7 is provided in the vicinity of a left end of the boundary between the LED module 21*a* and the LED module 21*e*, and a measurement area 26-8 is provided in the vicinity of a right end of the boundary between the LED module 21*a* and the LED module 21*e*. Therefore, in the measurement area 26-7 and the measurement area 26-8, the contrast for obtaining the joint correction value at the boundary between the LED module 21*a* and the LED module 21*e* is measured.

Figure 9:
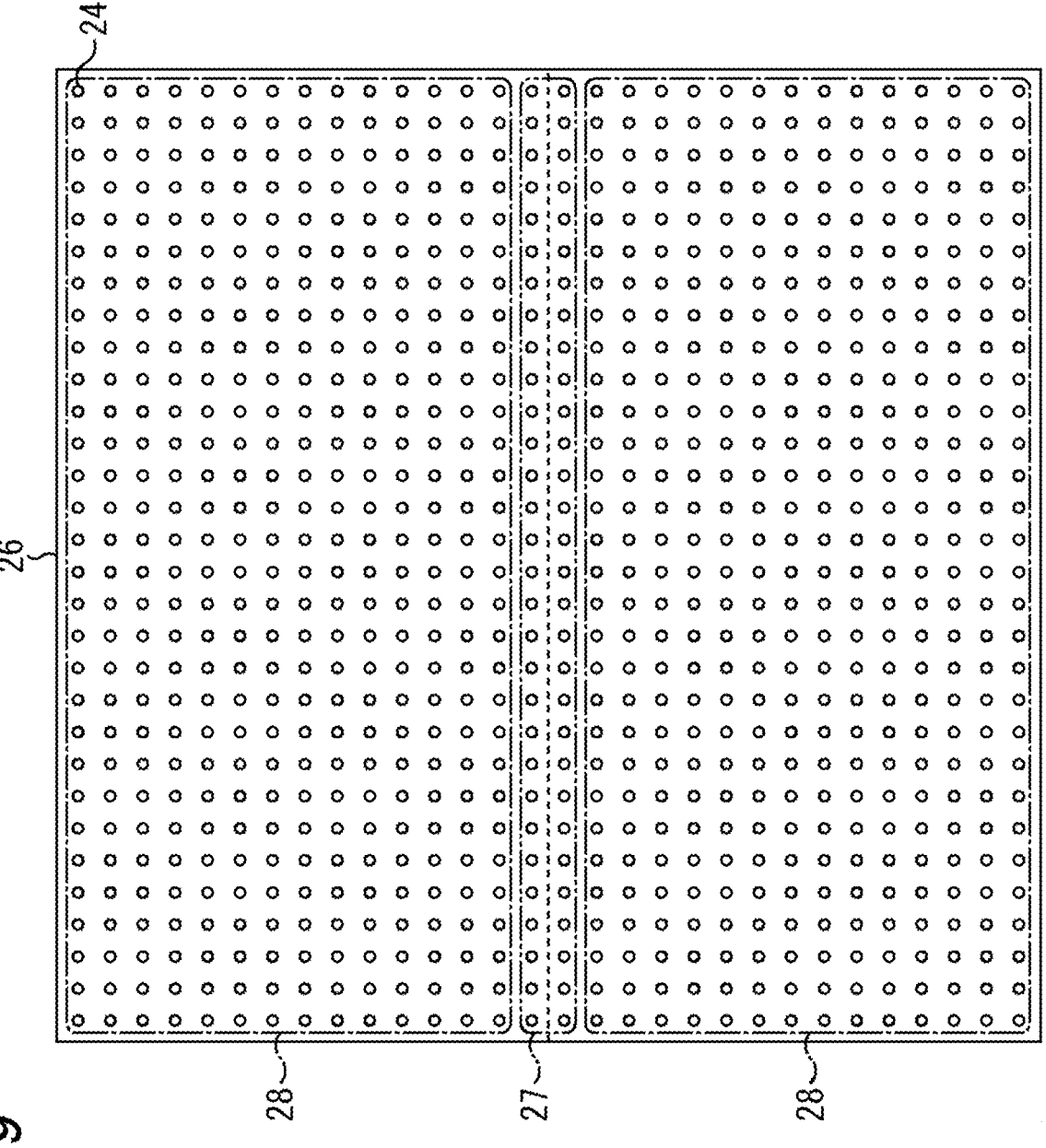
FIG. 9 is a diagram illustrating a joint area and a background area in the measurement area.

FIG. 9 illustrates an example in which the 30×30 array LED pixels 24 arranged in a matrix are set as the measurement area 26, and a boundary between the LED modules 21 arranged adjacent to each other is indicated by a broken line. Note that, in FIG. 9, the measurement of the contrast in the measurement area 26 in which the boundary between the LED modules 21 is oriented in a lateral direction will be described, but the contrast can be similarly measured in the measurement area 26 in which the boundary between the LED modules 21 is oriented in a longitudinal direction.

Furthermore, out of the measurement area 26, an area in which the LED pixels 24 of two rows arranged across the boundary between the LED modules 21 are provided is set as the joint area 27, and an area other than the joint area 27 is set as the background area 28. That is, the background area 28 is an area in which 30×14 array LED pixels 24 on an upper side of the joint area 27 and 30×14 array LED pixels 24 on a lower side of the joint area 27 are provided.

For example, the contrast measurement unit 53 instructs the display control unit 31 to display a green single color screen in the adjustment target range 22 of the LED display device 12. When the display control unit 31 performs control on the LED display device 12 in response to this, the LED display device 12 displays the green single color screen in the adjustment target range 22. Note that, a single color screen other than green, for example, a white single color screen may be used.

Then, the contrast measurement unit 53 instructs the camera control unit 32 to allow the camera 13 to image the LED display device 12. When the camera control unit 32 performs control on the camera 13 in response to this, the camera 13 images the LED display device 12 in a state in which the green single color screen is displayed in the adjustment target range 22. Therefore, the camera control unit 32 acquires the image and supplies the same to the contrast measurement unit 53.

As described above, the joint coordinate detection unit 51 notifies the contrast measurement unit 53 of the joint coordinates in the LED display device 12 on the image imaged by the camera 13. Furthermore, the measurement area detection unit 52 notifies the contrast measurement unit 53 of the measurement area 26 in the LED display device 12 on the image imaged by the camera 13. Therefore, the contrast measurement unit 53 can measure the brightness of each of the joint area 27 and the background area 28 of the measurement area 26 on the image of the LED display device 12 in a state in which the green single color screen is displayed in the adjustment target range 22.

For example, the joint area 27 is an area corresponding to the measurement area 26 and an area corresponding to the joint coordinates, and the contrast measurement unit 53 measures a brightness component of green in the area as the brightness of the joint area 27. Furthermore, the background area 28 is an area corresponding to the measurement area 26 and an area corresponding to an area other than the joint coordinates, and the contrast measurement unit 53 measures a brightness component of green in the area as the brightness of the background area 28.

Then, the contrast measurement unit 53 can calculate the contrast of the measurement area 26 (=the brightness of the joint area 27/the brightness of the background area 28) by dividing the brightness of the joint area 27 by the brightness of the background area 28.

Moreover, the contrast measurement unit 53 instructs the display control unit 31 to change brightness of the hatch area 25 to +10%, +5%, 0%, −5%, and −10% while displaying the green single color screen in the adjustment target range 22 of the LED display device 12. In response to this, the display control unit 31 performs control on the LED display device 12.

At the same time, the contrast measurement unit 53 instructs the camera control unit 32 to allow the camera 13 to image the LED display device 12 every time the brightness of the hatch area 25 changes. In response to this, the camera control unit 32 performs control on the camera 13.

Therefore, the contrast measurement unit 53 can acquire five images in which the brightness of the hatch area 25 is +10%, +5%, 0%, −5%, and −10% while displaying the green single color screen in the adjustment target range 22 of the LED display device 12. Then, on the basis of these five images, the contrast measurement unit 53 measures the contrast of the measurement area 26 as described above, and supplies a measurement result to the joint correction value calculation unit 54.

Figure 10:
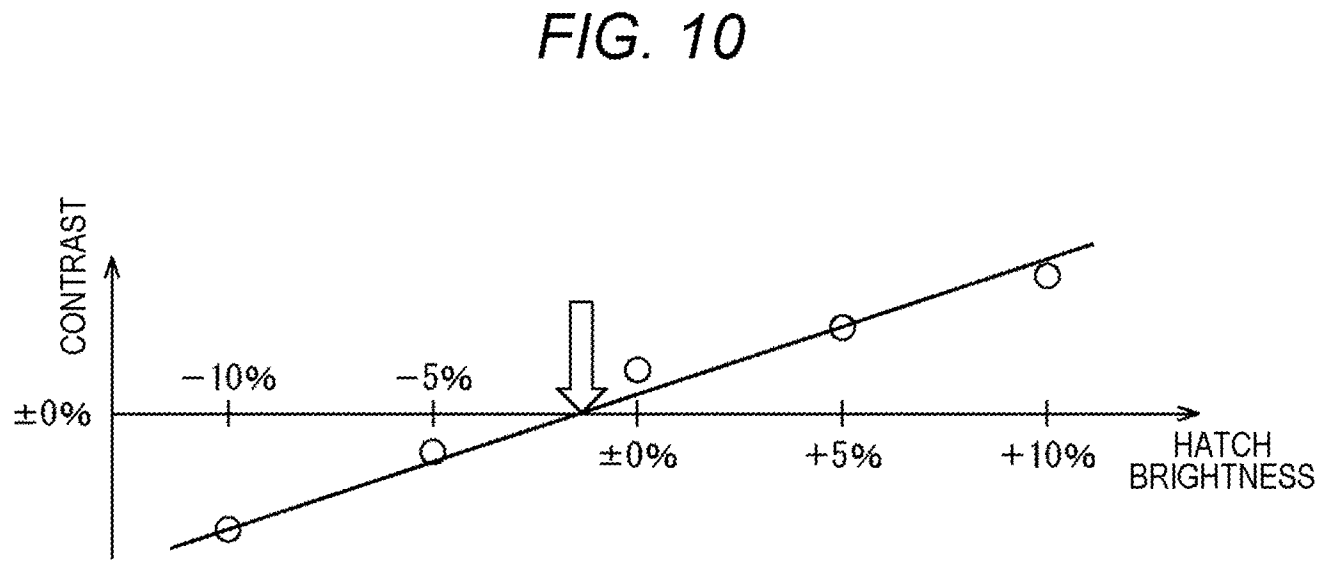

FIG. 10 illustrates an example of the measurement result of the contrast of the measurement area 26 with respect to the brightness of the hatch area 25.

The joint correction value calculation unit 54 performs linear interpolation on the measurement result of the contrast of the measurement area 26 when the brightness of the hatch area 25 is +10%, the measurement result of the contrast of the measurement area 26 when the brightness of the hatch area 25 is +5%, the measurement result of the contrast of the measurement area 26 when the brightness of the hatch area 25 is 0%, the measurement result of the contrast of the measurement area 26 when the brightness of the hatch area 25 is –5%, and the measurement result of the contrast of the measurement area 26 when the brightness of the hatch area 25 is –10%, and obtains the brightness of the hatch area 25 at which the contrast is zero. That is, the contrast of the measurement area 26 is zero at the brightness of the hatch area 25 indicated by a white arrow in FIG. 10.

Therefore, the joint correction value calculation unit 54 can calculate a signal level corresponding to the brightness of the hatch area 25 at which the contrast is zero as the joint correction value. That is, by correcting the luminance of the LED pixels 24 in two rows or two columns arranged across the boundary between the LED modules 21 according to the joint correction value, it is possible to prevent the joint from being conspicuous at that site. Then, the joint correction value calculation unit 54 similarly calculates the joint correction value for the boundary between all the LED modules 21 within the adjustment target range 22.

Then, the joint correction value calculation unit 54 supplies the calculated joint correction value to the joint correction value setting unit 55, and the joint correction value setting unit 55 writes and sets the joint correction value in the register of the LED display device 12. Therefore, when the joint correction value calculation unit 54 displays the green single color screen in the adjustment target range 22 of the LED display device 12, the correction according to the joint correction value is applied to the luminance of the LED pixels 24 in two rows or two columns arranged across the boundary between the respective LED modules 21. That is, the green single color screen is displayed in the adjustment target range 22 of the LED display device 12 in a state in which the luminance of the LED pixels 24 in two rows or two columns arranged across the boundary between the respective LED modules 21 is corrected according to the joint correction value.

At that time, if the joint correction value is appropriately obtained, the measurement results of the contrast of all the measurement area detection units 52 are zero. That is, similarly to the description above, when the contrast of the measurement area 26 is measured from five images in a state in which the brightness of the hatch area 25 is +10%, +5%, 0%, –5%, and –10%, respectively, and linear interpolation of the measurement result is performed, the contrast of the measurement area 26 is zero when the brightness of the hatch area 25 is 0%. In this manner, it can be confirmed that the joint adjustment processing has been appropriately performed.

Then, the joint correction value calculation unit 54 supplies the appropriately obtained joint correction value to the joint correction value setting unit 55. The joint correction value setting unit 55 writes the joint correction value supplied from the joint correction value calculation unit 54 in the rewritable nonvolatile memory of the LED display device 12, so that the luminance of the boundary between the LED modules 21 is corrected so that the joint is not conspicuous when the LED display device 12 is used.

Note that, instead of changing the brightness of the hatch area 25, the joint correction value calculation unit 54 may change the brightness of an area other than the hatch area 25 (for example, the background area 28) to obtain the joint correction value. Furthermore, the hatch area 25 may be an area of predetermined LED pixels 24 including the LED pixels 24 in two rows or two columns arranged across the boundary between the LED modules 21, and for example, an area of the LED pixels 24 in four rows or four columns may be the hatch area 25. Furthermore, the measurement area 26 is not limited to a rectangle as illustrated in FIG. 9, and may have any shape as long as this includes the boundary between the LED modules 21.

The joint adjustment processing screen will be described with reference to FIGS. 11 and 12.

Figure 11:
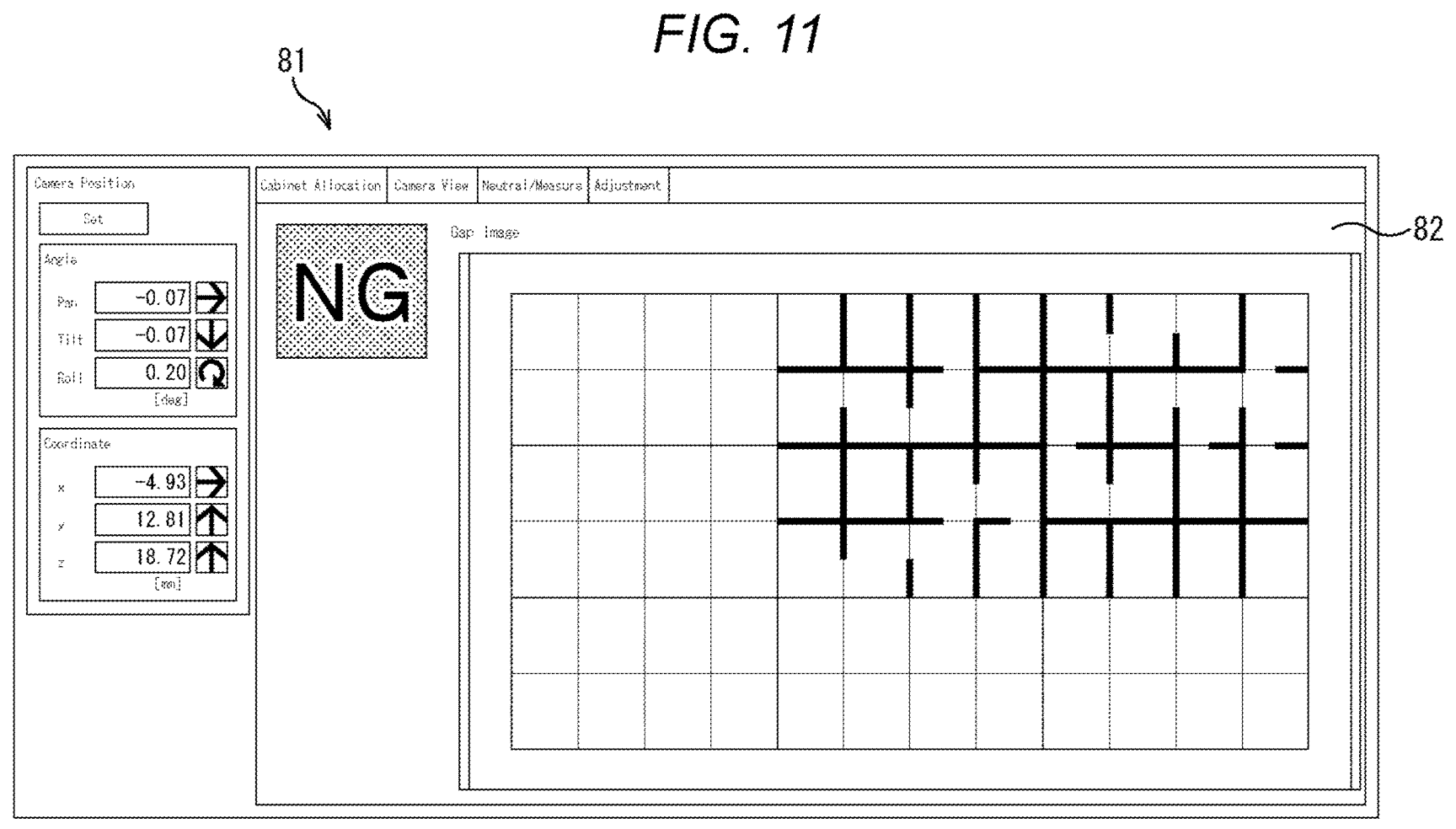

FIG. 11 illustrates the joint adjustment processing screen 81 in an NG state in which the joint adjustment processing is not appropriately performed, and a joint state display area 82 is provided on the joint adjustment processing screen 81. In the example illustrated in FIG. 11, in the joint state display area 82, boundaries between the LED modules 21 in the LED display device 12 are indicated by thin lines, and thick lines (guide display) indicating a boundary where the joint is conspicuous, that is, a boundary where the contrast of the measurement area 26 is not zero is displayed.

Figure 12:
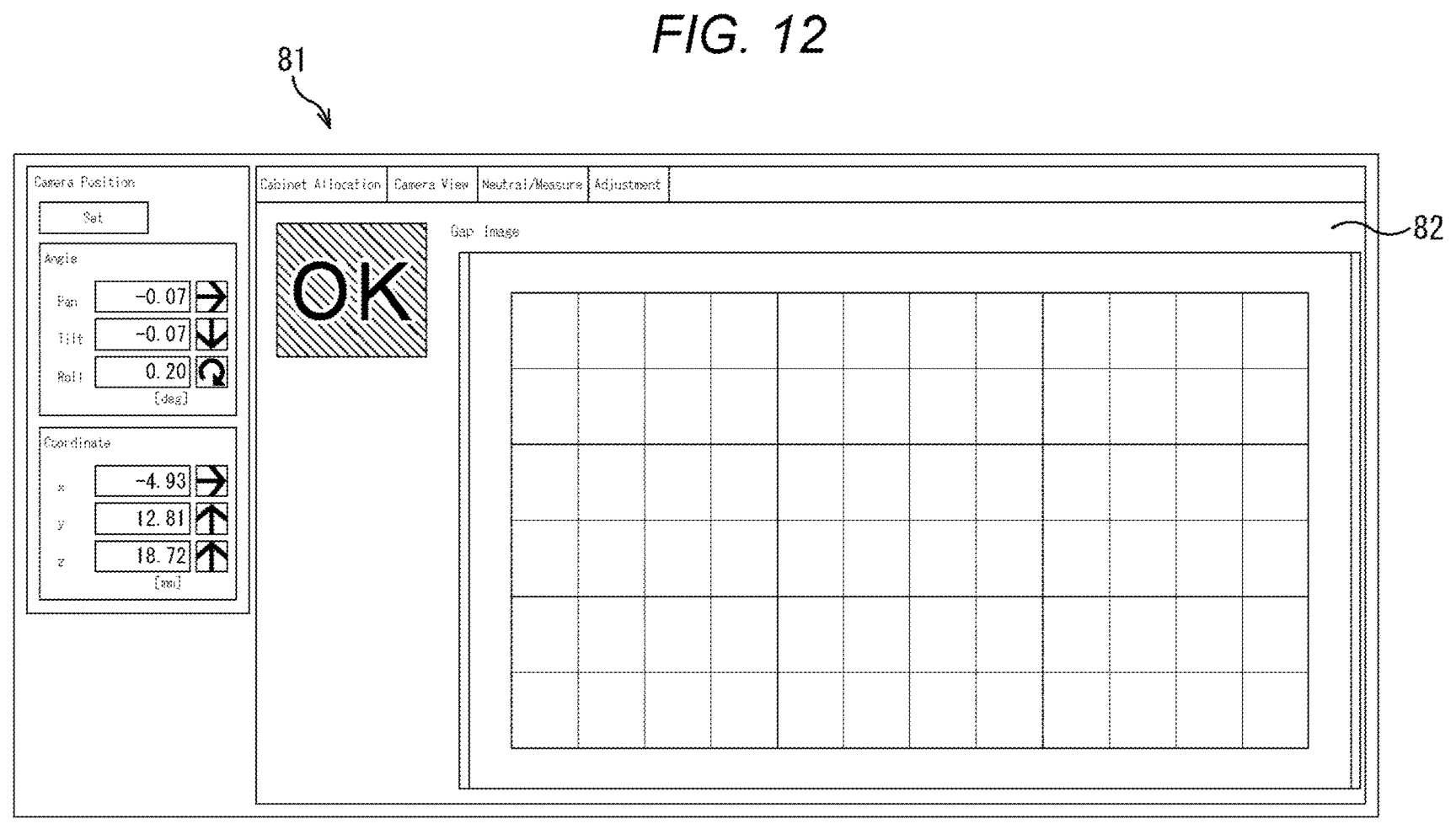

FIG. 12 illustrates the joint adjustment processing screen 81 in an OK state in which the joint adjustment processing is appropriately performed. In the example illustrated in FIG. 12, the boundaries between the LED modules 21 in the LED display device 12 displayed in the joint state display area 82 are all indicated by thin lines, indicating that there is no boundary where the joint is conspicuous.

The joint adjustment processing will be described with reference to a flowchart illustrated in FIG. 13.

At step S11, the camera positioning processing unit 41 performs the camera positioning processing as described above with reference to FIGS. 3 and 4 to display the camera positioning processing screen 71, displays the angle adjustment amount in the angle adjustment display area 73, and displays the position adjustment amount in the position adjustment display area 74. Therefore, the worker adjusts the angle and position of the camera 13 according to the angle adjustment amount and the position adjustment amount, thereby accurately installing the camera 13 in the position in front of the LED display device 12 and at the center of the adjustment target range 22.

At step S12, the external light removal processing unit 42 performs the external light removal processing as described above with reference to FIGS. 5A, 5B. 5C, and 5D to remove the influence of the external light, and limits the processing target range when the joint adjustment processing and uniformity adjustment processing are performed.

At step S13, pre-correction imaging is performed. Here, in the pre-correction imaging, imaging is performed in which the LED pixels 24 in the hatch area 25 are turned on in white as described above with reference to FIG. 7, imaging is performed in which the LED pixels 24 in the measurement area 26 are turned on in white as described above with reference to FIG. 8, and imaging is performed in which the brightness of the hatch area 25 is changed while displaying the green single color screen in the adjustment target range 22 of the LED display device 12 as described above with reference to FIG. 10. Therefore, by performing the pre-correction imaging, the joint correction value calculation unit 54 acquires the measurement results of the contrast of the measurement area 26 when the brightness of the hatch area 25 is +10%, +5%, 0%, –5%, and –10%, respectively.

At step S14, the joint correction value calculation unit 54 performs linear interpolation on the measurement result of the contrast acquired in the pre-correction imaging at step S13 as described above with reference to FIG. 10, and obtains the brightness of the hatch area 25 at which the contrast is zero. Then, the joint correction value calculation unit 54 calculates a signal level corresponding to the brightness of the hatch area 25 at which the contrast is zero as the joint correction value.

At step S15, the joint correction value setting unit 55 writes and sets the joint correction value calculated by the joint correction value calculation unit 54 at step S14 in the rewritable nonvolatile memory of the LED display device 12.

At step S16, post-correction imaging is performed. Here, the green single color screen is displayed in the adjustment target range 22 of the LED display device 12 in a state in which the correction is applied to the luminance of the LED pixels 24 in two rows or two columns arranged across the boundary between the respective LED modules 21 on the basis of the joint correction value. Then, as described above with reference to FIG. 10, imaging is performed in which the brightness of the hatch area 25 is changed while displaying the green single color screen in the adjustment target range 22 of the LED display device 12. Therefore, by performing the post-correction imaging, the joint correction value calculation unit 54 acquires the measurement results of the contrast of the measurement area 26 when the brightness of the hatch area 25 is +10%, +5%, 0%, −5%, and −10%, respectively in a state in which the correction by the joint correction value is applied. Furthermore, the joint adjustment processing screen 81 is displayed on the basis of the measurement result of the contrast.

At step S17, it is determined whether or not readjustment by manual adjustment is necessary. For example, the worker visually confirms a state in which the correction by the joint correction value is applied, and determines whether or not the manual adjustment is necessary on the basis of the thick line (that is, the boundary where the joint is conspicuous) displayed in the joint state display area 82 of the joint adjustment processing screen 81.

In a case where it is determined at step S17 that the readjustment by the manual adjustment is necessary, the processing proceeds to step S18, and the joint adjustment is performed by a manual adjusting method similar to the conventional method. In this case, the joint correction value according to the manual adjustment is supplied to the joint correction value setting unit 55. Note that, instead of performing the manual adjustment, the adjustment processing at steps S13 to S16 may be performed again. For example, a graphical user interface (GUI) for instructing to execute readjustment processing may be displayed on the joint adjustment processing screen 81 to allow the worker to select the manual adjustment or the readjustment processing.

At step S19, the joint correction value setting unit 55 writes the joint correction value subjected to the manual adjustment or the readjustment processing at step S18 in the rewritable nonvolatile memory of the LED display device 12, and then the processing is finished.

In contrast, in a case where it is determined at step S17 that the readjustment by the manual adjustment is not necessary, the joint correction value is already written at step S15, and the processing is finished.

By performing the joint adjustment processing as described above, the camera 13 can be easily installed, the joint coordinates and the measurement area 26 can be automatically detected to calculate the contrast and calculate an appropriate joint correction value by performing the image processing on the collectively imaged images, so that joint adjustment without variation can be implemented in a short time.

<Processing Example of Uniformity Adjustment Processing>

One example of the uniformity adjustment processing will be described with reference to FIGS. 14A, 14B, 14C, 15, 16, 17, 18, and 19.

Figure 14A:
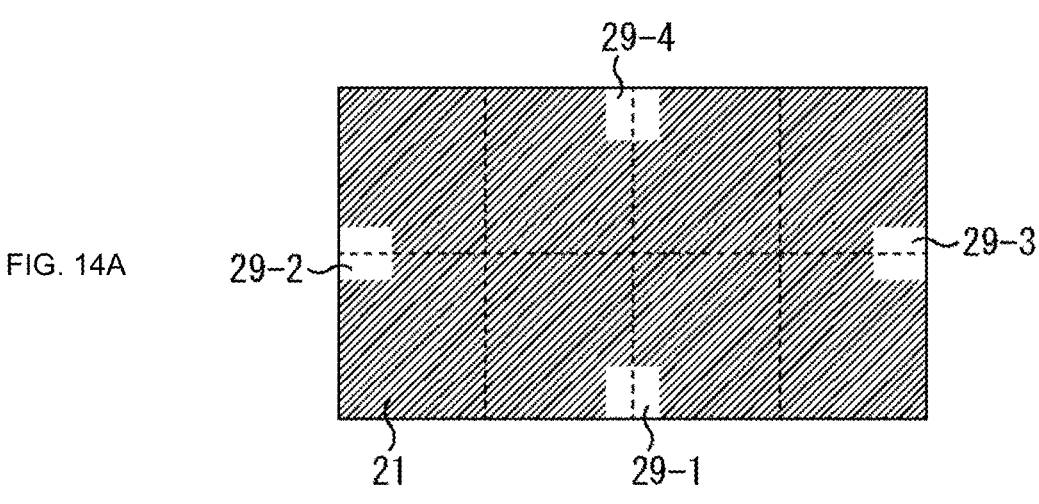
FIGS. 14A, 14B, and 14C are diagrams illustrating arrangement of measuring markers.
Figure 14B:
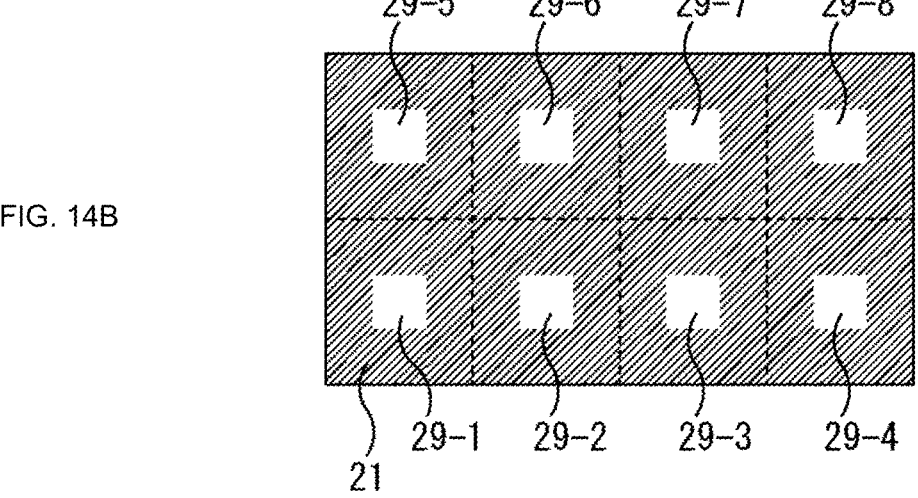
Figure 14C:
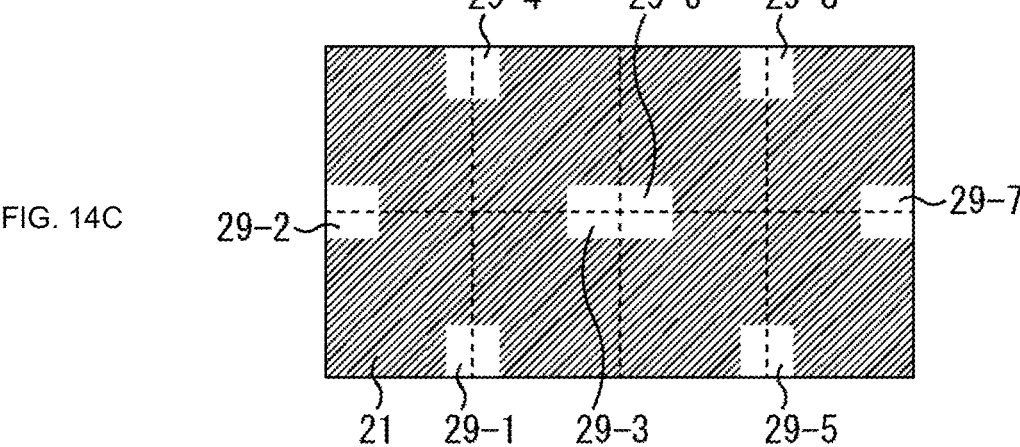

FIGS. 14A, 14B, and 14C illustrate the 2×4 array LED modules 21. Hereinafter, a group of the 2×4 array LED modules 21 as illustrated is referred to as a cabinet. The cabinet is operable as an individual display device, and the LED modules 21 in an array other than the 2×4 array may form the cabinet. Furthermore, the LED display device 12 is configured as a display device having an optional size and resolution by arranging a plurality of cabinets. Furthermore, in FIGS. 14A, 14B, and 14C, the marker 29 serving as an adjustment point when the uniformity adjustment processing is performed is displayed.

In FIG. 14A, the markers 29 are displayed at four sites that are centers of upper, lower, right, and left sides of the cabinet including the 2×4 array LED modules 21. That is, a marker 29-1 is displayed at the center of the lower side of the cabinet, a marker 29-2 is displayed at the center of the left side of the cabinet, a marker 29-3 is displayed at the center of the right side of the cabinet, and a marker 29-4 is displayed at the center of the upper side of the cabinet. In this manner, the uniformity adjustment processing can be performed in units of cabinets by displaying the markers 29, and such display of the markers 29 is referred to as a cabinet mode.

In FIG. 14B, the markers 29 are displayed at eight sites that are centers of each of the 2×4 array LED modules 21. In this manner, the uniformity adjustment processing can be performed in units of the LED modules 21 by displaying the markers 29, and such display of the markers 29 is referred to as a module mode.

In FIG. 14C, the cabinet including the 2×4 array LED modules 21 is divided into right and left portions, and the markers 29 are displayed at eight sites that are the centers of upper, lower, right, and left sides of each of the 2×2 array LED modules 21 on the left side and the 2×2 array LED modules 21 on the right side. That is, the marker 29-1 is displayed at the center of the lower side of the 2×2 array LED modules 21 on the left side, the marker 29-2 is displayed at the center of the left side of the 2×2 array LED modules 21 on the left side, the marker 29-3 is displayed at the center of the right side of the 2×2 array LED modules 21 on the left side, and the marker 29-4 is displayed at the center of the upper side of the 2×2 array LED modules 21 on the left side. Furthermore, a marker 29-5 is displayed at the center of the lower side of the 2×2 array LED modules 21 on the right side, a marker 29-6 is displayed at the center of the left side of the 2×2 array LED modules 21 on the left side, a marker 29-7 is displayed at the center of the right side of the 2×2 array LED modules 21 on the right side, and the marker 29-8 is displayed at the center of the upper side of the 2×2 array LED modules 21 on the right side. In this manner, the uniformity adjustment processing can be performed in units of the 2×2 array LED modules 21 by displaying the markers 29, and such display of the markers 29 is referred to as a radiator mode.

First, in the uniformity adjustment processing, the marker display unit 61 instructs the display control unit 31 to display the markers 29 in any of the modes illustrated in FIGS. 14A, 14B, and 14C. Therefore, the display control unit 31 performs control on the LED display device 12 so as to display the markers 29 in any of the modes illustrated in FIGS. 14A, 14B, and 14C, that is, in such a manner that the LED pixels 24 of the markers 29 are turned on in white and the LED pixels 24 of other than the markers 29 are turned off.

Then, the marker display unit 61 instructs the camera control unit 32 to allow the camera 13 to image the LED display device 12. When the camera control unit 32 performs control on the camera 13 in response to this, the camera 13 images the LED display device 12 in a state in which the LED pixels 24 of the markers 29 are turned on in white. Therefore, the camera control unit 32 acquires the image and supplies the same to the marker display unit 61.

Therefore, the marker display unit 61 can detect the markers 29 in the LED display device 12 on the image on the basis of the image obtained by imaging the LED display device 12 in a state in which the LED pixels 24 of the markers 29 are turned on in white. Then, the marker display unit 61 notifies the luminance data calculation unit 63 of the markers 29 in the LED display device 12 on the image imaged by the camera 13.

Next, in the uniformity adjustment processing, the single color display unit 62 instructs the display control unit 31 to display a red single color image, a green single color image, and a blue single color image corresponding to the light emission colors of the LED elements included in the LED pixels 24. Therefore, the display control unit 31 performs control on the LED display device 12 so as to sequentially display the red single color image, the green single color image, and the blue single color image. At the same time, the single color display unit 62 instructs the camera control unit 32 to allow the camera 13 to image the LED display device 12 every time the color of the display control unit 31 changes. In response to this, the camera control unit 32 performs control on the camera 13.

Therefore, the single color display unit 62 can acquire three images obtained by imaging the LED display device 12 that displays the red single color image, the green single color image, and the blue single color image, and supply the images to the luminance data calculation unit 63. Here, an image obtained by imaging the LED display device 12 that displays the red single color image is referred to as a red single color imaged image. Similarly, an image obtained by imaging the LED display device 12 that displays the green single color image is referred to as a green single color imaged image, and an image obtained by imaging the LED display device 12 that displays the blue single color image is referred to as a blue single color imaged image.

Here, since shading in which brightness of a peripheral portion drops occurs in the image imaged by the camera 13, the luminance data calculation unit 63 corrects lens shading of the red single color imaged image, the green single color imaged image, and the blue single color imaged image on the basis of a lens calibration table according to the lens used by the camera 13. Moreover, since the LED pixel 24 of the LED display device 12 has a viewing angle characteristic, the luminance data calculation unit 63 corrects the viewing angle characteristics of the red single color imaged image, the green single color imaged image, and the blue single color imaged image on the basis of an LED calibration table so as to obtain the brightness when the LED pixel 24 is viewed from the front.

In this manner, the luminance data calculation unit 63 corrects the lens shading and the viewing angle characteristics of the red single color imaged image, the green single color imaged image, and the blue single color imaged image, and calculates the luminance data of the area of the marker 29 in each corrected image. That is, the luminance data calculation unit 63 calculates the luminance data of red from the area of the marker 29 in the red single color imaged image in which the lens shading and the viewing angle characteristic are corrected. Similarly, the luminance data calculation unit 63 calculates the luminance data of green from the area of the marker 29 in the green single color imaged image in which the lens shading and the viewing angle characteristic are corrected, and calculates the luminance data of blue from the area of the marker 29 in the blue single color imaged image in which the lens shading and the viewing angle characteristic are corrected. Then, the luminance data calculation unit 63 supplies the luminance data of red, the luminance data of green, and the luminance data of blue to the uniformity correction value calculation unit 64.

The uniformity correction value calculation unit 64 holds the reference luminance data serving as a reference of each of the red single color imaged image, the green single color imaged image, and the blue single color imaged image. For example, the uniformity correction value calculation unit 64 can acquire the reference luminance data by imaging a reference cabinet in advance. Alternatively, the uniformity correction value calculation unit 64 may acquire the reference luminance data by imaging the LED module 21 serving as the reference, an area designated by the worker and the like in advance, or may acquire an externally input value as the reference luminance data.

Then, the uniformity correction value calculation unit 64 compares the reference luminance data of the red single color imaged image with the luminance data of red supplied from the luminance data calculation unit 63 to convert a relative luminance ratio, thereby creating luminance comparison data of red for each marker 29. Similarly, the uniformity correction value calculation unit 64 creates luminance comparison data of green and luminance comparison data of blue for each marker 29 for the green single color imaged image and the blue single color imaged image.

Then, the uniformity correction value calculation unit 64 calculates the uniformity correction value of red from the luminance comparison data of red for each marker 29, calculates the uniformity correction value of green from the luminance comparison data of green for each marker 29, and calculates the uniformity correction value of blue from the luminance comparison data of blue for each marker 29.

For example, in a case where the uniformity correction value calculation unit 64 is in the cabinet mode in which the markers 29 are displayed as illustrated in FIG. 14A, this calculates the uniformity correction value in units of cabinets by performing linear interpolation between the markers 29. Furthermore, in a case where the uniformity correction value calculation unit 64 is in the module mode in which the markers 29 are displayed as illustrated in FIG. 14B, this calculates the uniformity correction value in units of LED modules 21 in which each marker 29 is displayed. Furthermore, in a case where the uniformity correction value calculation unit 64 is in the radiator mode in which the markers 29 are displayed as illustrated in FIG. 14C, this calculates the uniformity correction value in units of 2×2 array LED modules 21 by performing the linear interpolation between the markers 29.

Then, the uniformity correction value calculation unit 64 supplies the uniformity correction value of red, the uniformity correction value of green, and the uniformity correction value of blue to the uniformity correction value setting unit 65. The uniformity correction value setting unit 65 writes and sets the uniformity correction value of red, the uniformity correction value of green, and the uniformity correction value of blue in the register of the LED display device 12. Therefore, for example, when the single color display unit 62 allows the LED display device 12 to display each of the red single color image, the green single color image, and the blue single color image, the red single color image, the green single color image, and the blue single color image are displayed so as to be uniform as a whole.

At that time, if the uniformity correction value is appropriately obtained, the luminance data of all the markers 29 are uniform values, and it can be confirmed that the uniformity adjustment processing is appropriately performed.

Then, the uniformity correction value calculation unit 64 supplies the appropriately obtained uniformity correction value to the uniformity correction value setting unit 65. The uniformity correction value setting unit 65 writes the uniformity correction value supplied from the uniformity correction value calculation unit 64 in the rewritable nonvolatile memory of the LED display device 12, so that the luminance is corrected so that the image having uniformity as a whole is displayed when the LED display device 12 is used. This makes it possible to correct a luminance difference between the cabinets or between the LED modules 21 due to individual differences at the time of manufacturing or deterioration over time.

Note that, in the uniformity adjustment processing, in addition to using the red single color image, the green single color image, and the blue single color image, a white single color image, an invisible light single color image (in a case where the LED pixel 24 capable of outputting invisible light is used) or the like may be used according to the configuration of the LED pixel 24. Furthermore, these single color images are not necessarily displayed on the entire surface of the LED display device 12, and for example, the uniformity adjustment processing can be performed as long as they are displayed in at least the marker 29.

The uniformity adjustment processing screen will be described with reference to FIGS. 15 to 18.

Figure 15:
FIG. 15 is a view illustrating a first display example of a uniformity adjustment processing screen in an NG state.

FIG. 15 illustrates the uniformity adjustment processing screen 91 in the NG state in which the uniformity adjustment processing is not appropriately performed, and a uniformity state display area 92 is provided on the uniformity adjustment processing screen 91. Furthermore, FIG. 15 illustrates an example in which a range in which the cabinets including the 2×4 array LED modules 21 are arranged in 3×2 (height× width) is the adjustment target range. In the example illustrated in FIG. 15, in the uniformity state display area 92, the LED module 21 not having uniformity with respect to an entire adjustment target range is indicated in black (guide display).

Figure 16:
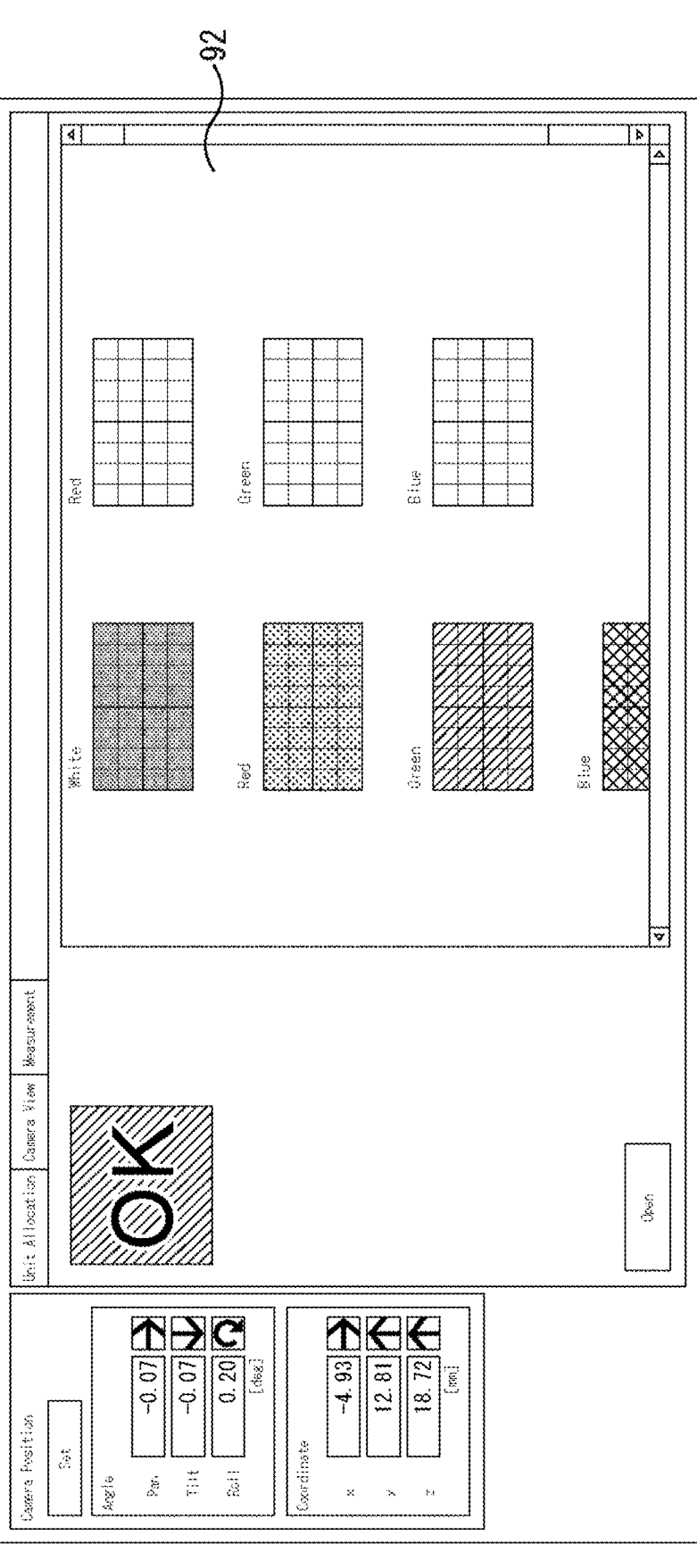
FIG. 16 is a view illustrating a first display example of a uniformity adjustment processing screen in an OK state.

FIG. 16 illustrates the uniformity adjustment processing screen 91 in the OK state in which the uniformity adjustment processing is appropriately performed. Furthermore, FIG. 16 illustrates an example in which a range in which the cabinets including the 2×4 array LED modules 21 are arranged in 2×2 (height×width) is the adjustment target range. In the example illustrated in FIG. 16, it is illustrated that there is no LED module 21 not having uniformity with respect to the entire adjustment target range in the uniformity state display area 92, that is, all the LED modules 21 have uniformity.

Figure 17:
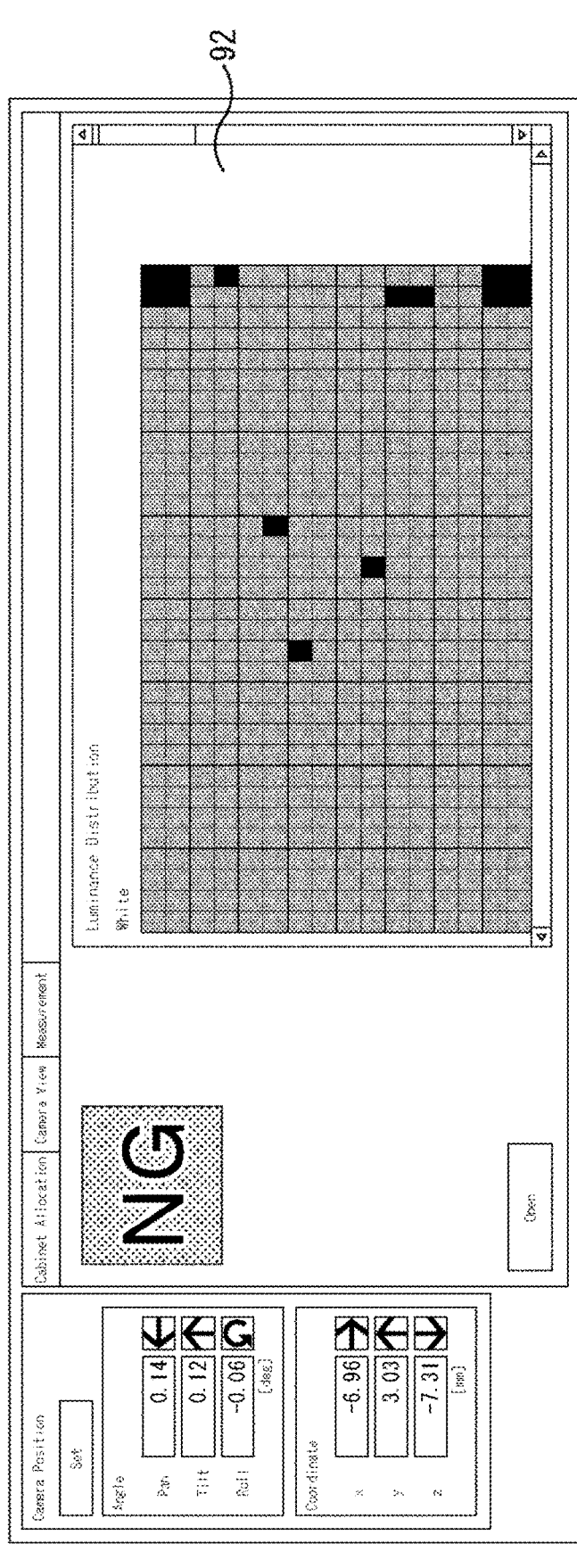
FIG. 17 is a view illustrating a second display example of a uniformity adjustment processing screen in an NG state.

FIG. 17 illustrates the uniformity adjustment processing screen 91 in the NG state in which the uniformity adjustment processing is not appropriately performed, and the uniformity state display area 92 is provided on the uniformity adjustment processing screen 91. Furthermore, FIG. 17 illustrates an example in which an entire range of the LED display device 12 is the adjustment target range. In the example illustrated in FIG. 17, in the uniformity state display area 92, the LED module 21 not having uniformity with respect to the entire adjustment target range is indicated in black (guide display).

Figure 18:
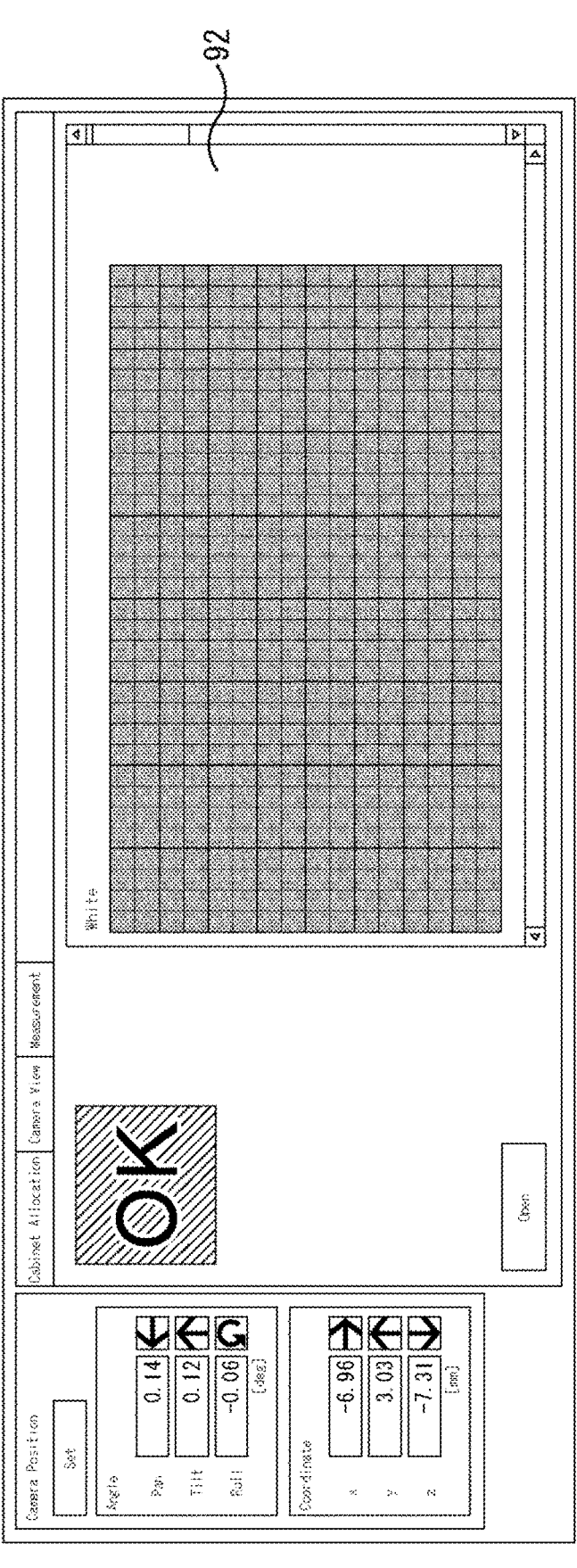
FIG. 18 is a view illustrating a second display example of a uniformity adjustment processing screen in an OK state.

FIG. 18 illustrates the uniformity adjustment processing screen 91 in the OK state in which the uniformity adjustment processing is appropriately performed. Furthermore, FIG. 18 illustrates an example in which the entire range of the LED display device 12 is the adjustment target range. In the example illustrated in FIG. 18, it is illustrated that there is no LED module 21 not having uniformity with respect to the entire adjustment target range in the uniformity state display area 92, that is, all the LED modules 21 have uniformity.

The uniformity adjustment processing will be described with reference to a flowchart illustrated in FIG. 19.

Figure 13:
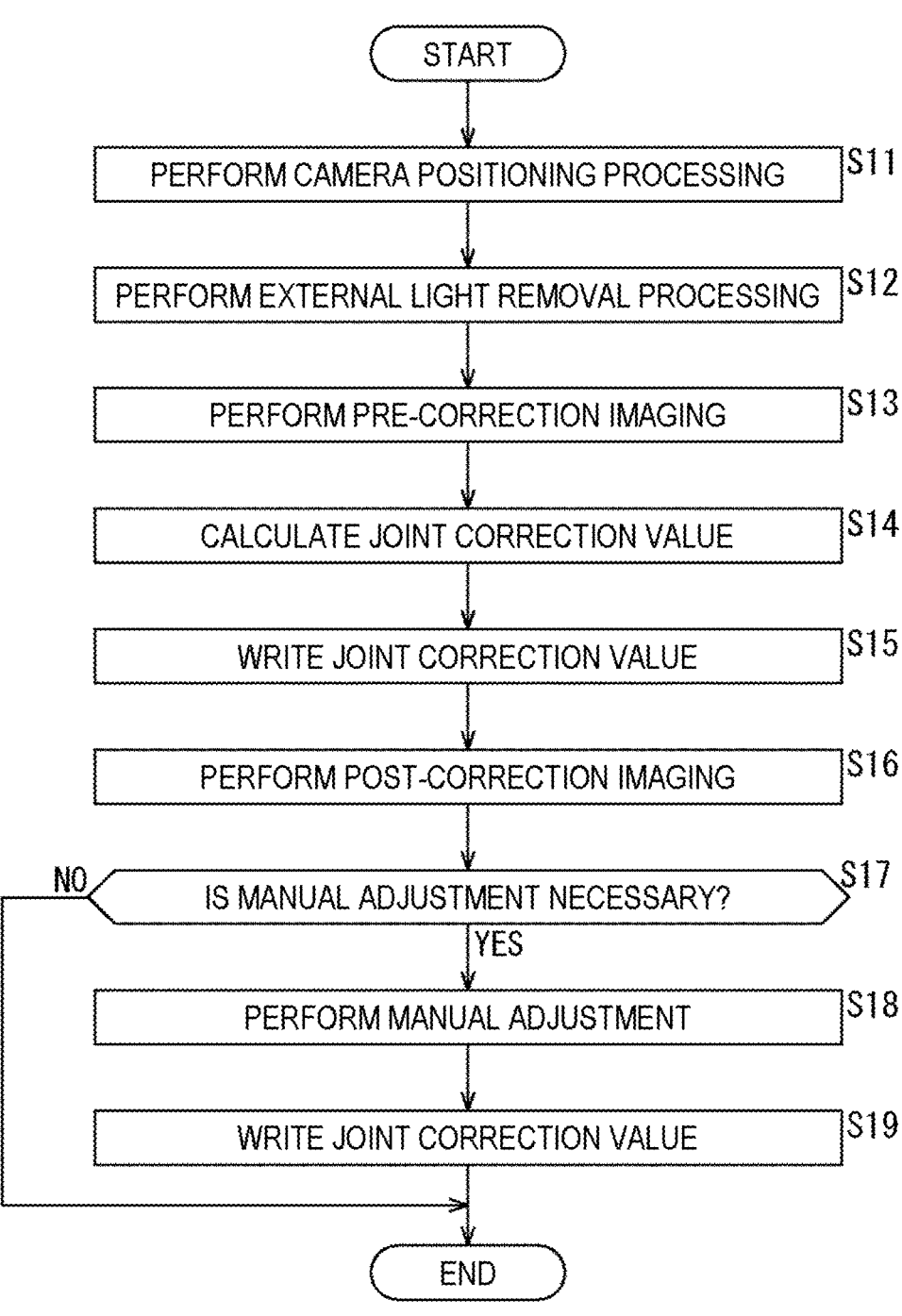
FIG. 13 is a flowchart illustrating joint adjustment processing.

At steps S21 and S22, processing similar to that at steps S11 and S12 of FIG. 13 is performed.

At step S23, pre-correction imaging is performed. Here, in the pre-correction imaging, as described above with reference to FIGS. 14A, 14B, and 14C imaging is performed in which the LED pixels 24 of the markers 29 are turned on in white, and imaging of the display control unit 31 in a state in which the red single color image, the green single color image, and the blue single color image are displayed is performed. Then, when the pre-correction imaging is performed, the luminance data calculation unit 63 acquires the luminance data of red, the luminance data of green, and the luminance data of blue for each marker 29.

At step S24, the uniformity correction value calculation unit 64 creates the luminance comparison data of red for each marker 29, and calculates the uniformity correction value of red from the luminance comparison data. Similarly, the uniformity correction value calculation unit 64 creates the luminance comparison data of green for each marker 29 to calculate the uniformity correction value of green, and creates the luminance comparison data of blue for each marker 29 to calculate the uniformity correction value of blue.

At step S25, the uniformity correction value setting unit 65 writes and sets the uniformity correction value calculated by the uniformity correction value calculation unit 64 at step S24 in the rewritable nonvolatile memory of the LED display device 12.

At step S26, post-correction imaging is performed. Here, in the post-correction imaging, the red single color image, the green single color image, and the blue single color image are displayed on the LED display device 12 in a state in which the correction based on the uniformity correction value set for the LED display device 12 is applied. Then, similarly to the pre-correction imaging at step S23, the luminance data calculation unit 63 acquires the luminance data of red, the luminance data of green, and the luminance data of blue for each marker 29. Furthermore, the uniformity adjustment processing screen 91 is displayed on the basis of the luminance data of red, the luminance data of green, and the luminance data of blue.

At step S27, it is determined whether or not readjustment by manual adjustment is necessary. For example, the worker visually confirms a state in which the correction by the uniformity correction value is applied, and determines whether or not the manual adjustment is necessary on the basis of black paint (that is, the LED module 21 not having uniformity) displayed in the uniformity state display area 92 of the uniformity adjustment processing screen 91.

In a case where it is determined at step S27 that the readjustment by the manual adjustment is necessary, the processing proceeds to step S28, and the uniformity adjustment is performed by a manual adjusting method similar to the conventional method. In this case, the uniformity correction value according to the manual adjustment is supplied to the uniformity correction value setting unit 65. Note that, instead of performing the manual adjustment, the adjustment processing at steps S23 to S26 may be performed again. For example, a GUI for instructing to execute the readjustment processing may be displayed on the uniformity adjustment processing screen 91 to allow the worker to select the manual adjustment or the readjustment processing.

At step S29, the uniformity correction value setting unit 65 writes the uniformity correction value subjected to the manual adjustment or the readjustment processing at step S28 in the rewritable nonvolatile memory of the LED display device 12, and then the processing is finished.

In contrast, in a case where it is determined at step S27 that the readjustment by the manual adjustment is not necessary, the uniformity correction value is already written at step S25, and the processing is finished.

By performing the uniformity adjustment processing as described above, the camera 13 can be easily installed, the markers 29 can be automatically detected to calculate the luminance data of red, green, and blue and calculate an appropriate uniformity correction value by performing the image processing on the collectively imaged images, so that the uniformity adjustment without variation can be implemented in a short time.

<Camera Posture Estimation Method>

Figure 20:
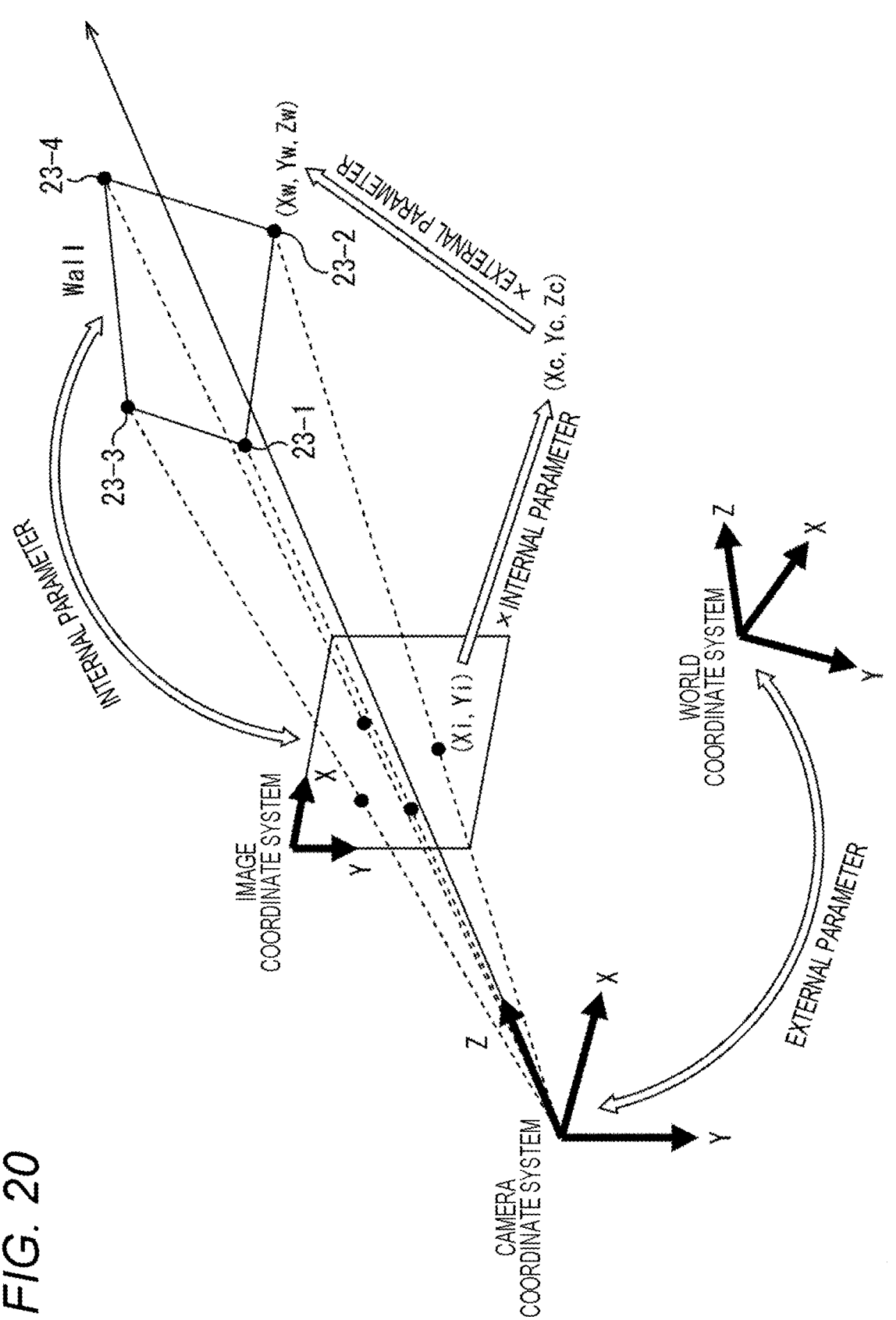
FIG. 20 is a diagram illustrating a posture estimation method for estimating posture of a camera.

A posture estimation method for estimating posture of the camera 13 will be described with reference to FIG. 20.

As described above, in the display system 11, it is necessary to install the camera 13 in the position in front of the LED display device 12 and at the center of the adjustment target range 22 to perform the joint adjustment processing unit and the uniformity adjustment processing. In contrast, even in a case where the camera 13 is installed in a position away from the front of the LED display device 12 or the center of the adjustment target range 22, by estimating the posture of the camera 13, the joint adjustment processing unit and the uniformity adjustment processing can be performed as in a case where the camera 13 is installed in the position in front of the LED display device 12 and at the center of the adjustment target range 22.

For example, in order to estimate the posture of the camera 13, it is necessary to acquire in advance shape information indicating a shape of the LED display device 12 and height information indicating a height at which the camera 13 is installed. A world coordinate system is provided in such a manner that an XY plane of the world coordinate system is parallel to the display surface of the LED display device 12 on the basis of the shape information of the LED display device 12. The camera coordinate system is provided so as to be parallel to an imaging element with the center of the imaging element of the camera 13 as an origin, and an origin of the camera coordinate system in the Y direction is set according to the height information of the camera 13.

Then, as illustrated in FIG. 3 described above, the markers 23-1 to 23-4 for positioning are displayed at the four corners of the adjustment target range 22, and imaging is performed by the camera 13. Coordinates (Xw, Yw, Zw) of the markers 23-1 to 23-4 on the display surface of the LED display device 12 are represented in a three-dimensional world coordinate system.

Coordinates (Xi, Yi) of points at which the markers 23-1 to 23-4 are imaged in the image imaged by the camera 13 are represented in a two-dimensional image coordinate system. The coordinates (Xi, Yi) can be converted into coordinates (Xc, Yc, Zc) according to a three-dimensional camera coordinate system using internal parameters as represented in following expression (1).

[Mathematical Expression 1]

$$\begin{bmatrix} Xc \\ Yc \\ Zc \end{bmatrix}_{\substack{CAMERA \\ COORDINATE \\ SYSTEM}} = Zc \times \begin{bmatrix} fx & 0 & cx \\ 0 & fy & cy \\ 0 & 0 & 1 \end{bmatrix}^{-1}_{\substack{INTERNAL \\ PARAMETER}} \times \begin{bmatrix} Xi \\ Yi \\ 1 \end{bmatrix}_{\substack{IMAGE \\ COORDINATE \\ SYSTEM}} \quad (1)$$

$fx/fy$: LENS FOCAL DISTANCE
$cx/cy$: OFFSET OF IMAGE COORDINATE POINT

The coordinates (Xc, Yc, Zc) representing the coordinates (Xi, Yi) of the points at which the markers 23-1 to 23-4 are imaged on the image in the camera coordinate system can be converted into the coordinates (Xw, Yw, Zw) of the markers 23-1 to 23-4 on the display surface of the LED display device 12 using external parameters as represented in following expression (2).

[Mathematical Expression 2]

$$\begin{bmatrix} Xw \\ Yw \\ Zw \\ 1 \end{bmatrix}_{\substack{WORLD \\ COORDINATE \\ SYSTEM}} = \begin{bmatrix} r11 & r12 & r13 & t1 \\ r21 & r22 & r23 & t2 \\ r31 & r32 & r33 & t3 \end{bmatrix}_{EXTERNAL\ PARAMETER} \times \begin{bmatrix} Xc \\ Yc \\ Zc \\ 1 \end{bmatrix}_{\substack{CAMERA \\ COORDINATE \\ SYSTEM}} \quad (2)$$

Therefore, the posture of the camera 13 can be estimated by calculating the external parameters represented in this expression (2) by the least squares method. Note that, by displaying a larger number of markers 23, estimation accuracy of the posture of the camera 13 can be improved.

<Handling of Reflection of External Light>

A countermeasure against reflected external light will be described with reference to FIGS. 21 and 22.

Figure 19:
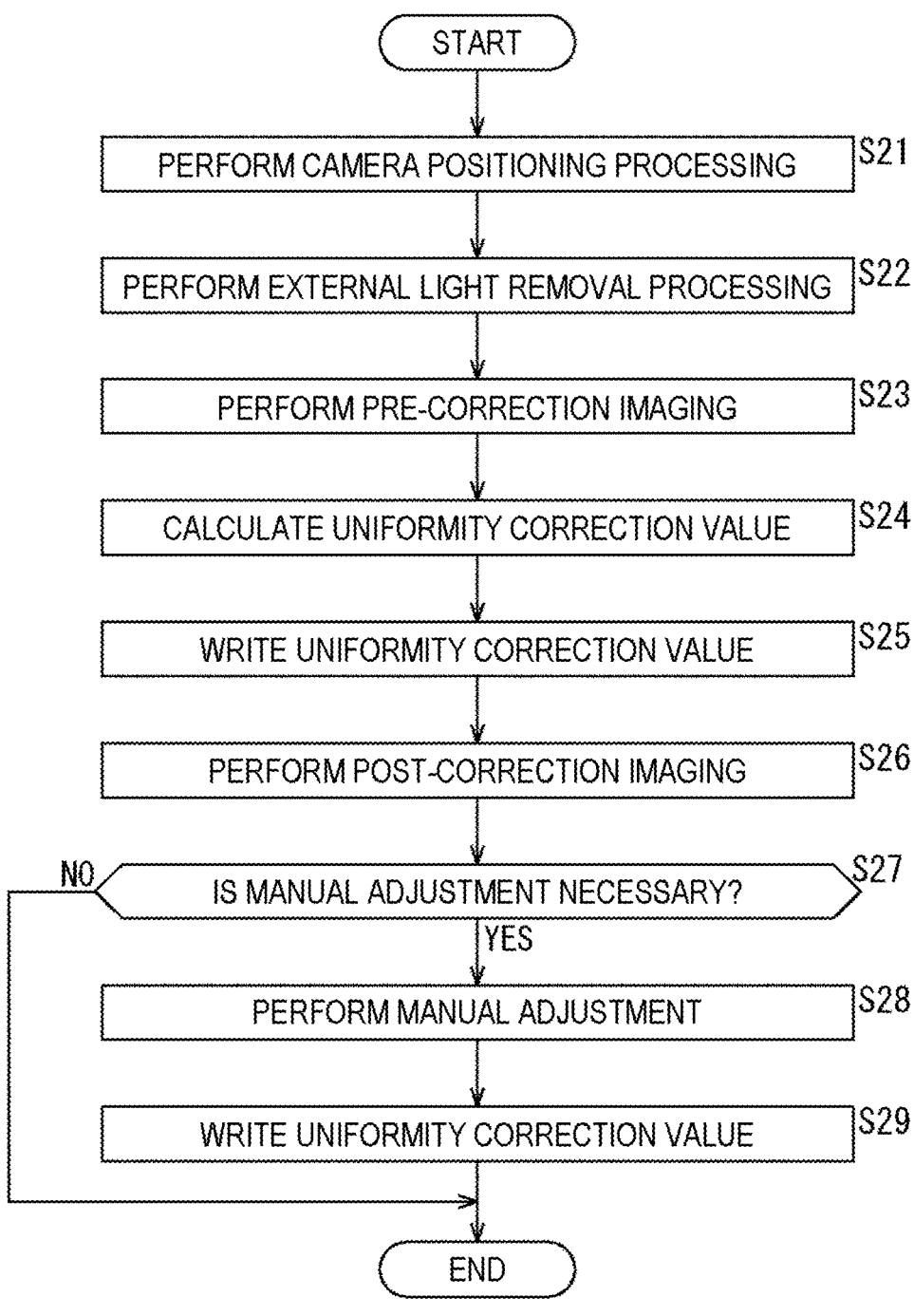
FIG. 19 is a flowchart illustrating uniformity adjustment processing.

In the display system 11, external light reflection removal processing for removing external light reflected in the LED display device 12 (that is, light other than light emitted when an image is displayed on the LED display device 12) can be performed in the above-described pre-correction imaging (step S13 in FIG. 13 and step S23 in FIG. 19).

Figure 21:
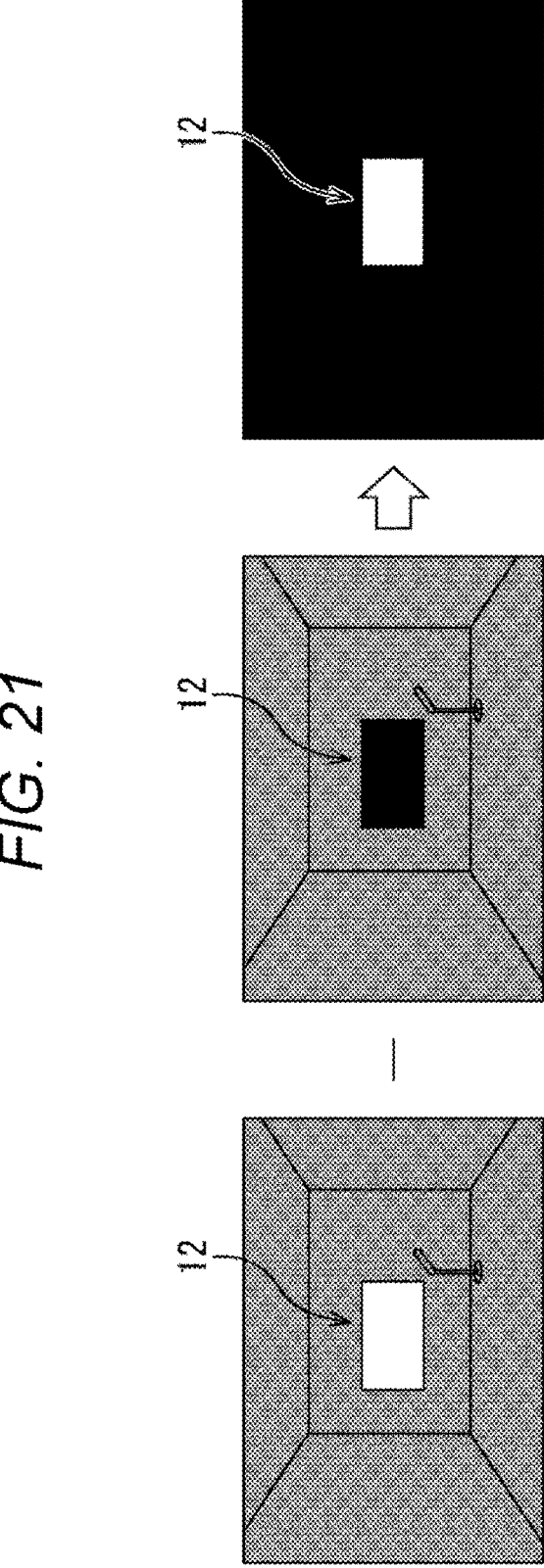
FIG. 21 is a diagram illustrating external light reflection removal processing.

In the external light reflection removal processing, as illustrated on a left side of FIG. 21, a single color screen of a certain color is displayed on the entire surface of the LED display device 12 and imaged by the camera 13, and as illustrated in the center of FIG. 21, a black image is displayed on the entire surface of the LED display device 12 (or, the entire surface of the LED display device 12 is turned off) and imaged by the camera 13. At that time, if an environment in which the LED display device 12 is installed is not changed, the external light reflected in the LED display device 12 is imaged in both images.

Then, the external light reflected in the LED display device 12 can be removed by obtaining a difference between an image obtained by displaying the single color screen of a certain color on the LED display device 12 and imaging the same, and an image obtained by displaying the black image on the entire surface of the LED display device 12 and imaging the same. Therefore, as illustrated on a right side of FIG. 21, image data of only the single color screen displayed on the LED display device 12 can be acquired. Therefore, by performing the joint adjustment processing and the uniformity adjustment processing using the image data of only the single color screen displayed on the LED display device 12, the adjustment can be performed more accurately.

Furthermore, in the display system 11, by checking the external light reflected in the LED display device 12 before and after each imaging performed in the joint adjustment processing and the uniformity adjustment processing, it is possible to prevent erroneous adjustment due to a change in illuminance of the external light reflected in the LED display device 12.

Figure 22:
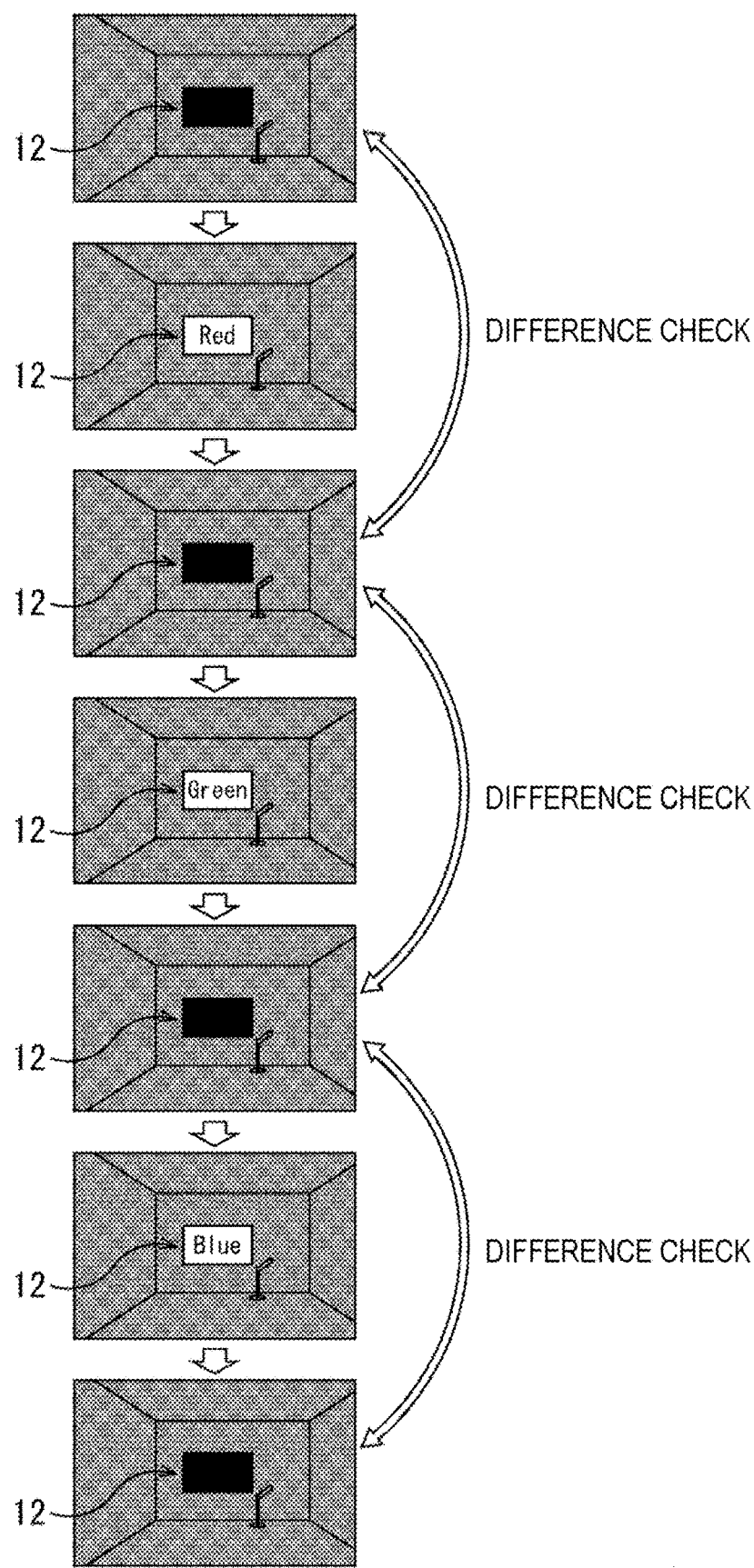
FIG. 22 is a diagram illustrating a change in illuminance of external light reflected in the LED display device.

For example, as illustrated in FIG. 22, before and after the red single color screen, the green single color screen, and the blue single color screen are displayed on the entire surface of the LED display device 12, the black image is displayed on the entire surface of the LED display device 12. Then, by checking the difference in the area in which the LED display device 12 is imaged before and after the red single color screen is displayed, it is possible to confirm the change in illuminance of the external light. Similarly, by checking the difference in the area in which the LED display device 12 is imaged before and after the green single color screen is displayed, and before and after the blue single color screen is displayed, it is possible to confirm the change in illuminance of the external light. For example, in the joint adjustment processing, the change in illuminance of the external light is confirmed by subtraction in units of pixels of the imaging element of the camera 13, and in the uniformity adjustment processing, the change in illuminance of the external light is confirmed for each cabinet serving as a unit of measurement.

Then, in the display system 11, in a case where the change in illuminance of the external light is large, the joint adjustment processing or the uniformity adjustment processing can be interrupted. That is, in a case where a dynamic influence of the external light is large, the adjustment cannot be accurately performed, so that it is necessary to interrupt the processing and eliminate the influence of the external light.

<Uniformity Adjustment Processing>

The uniformity adjustment processing will be described with reference to FIGS. 23, 24A, 24B, 25A, 25B, 25C, and 26.

In the display system 11, as described above, the uniformity adjustment processing can be performed in units of cabinets, which are the group of a plurality of LED modules 21. At that time, when the uniformity adjustment processing is performed while a certain cabinet is set as the adjustment target range 22, the cabinet to which the uniformity adjustment processing is applied adjacent to the cabinet can be used as a reference.

Figure 23:
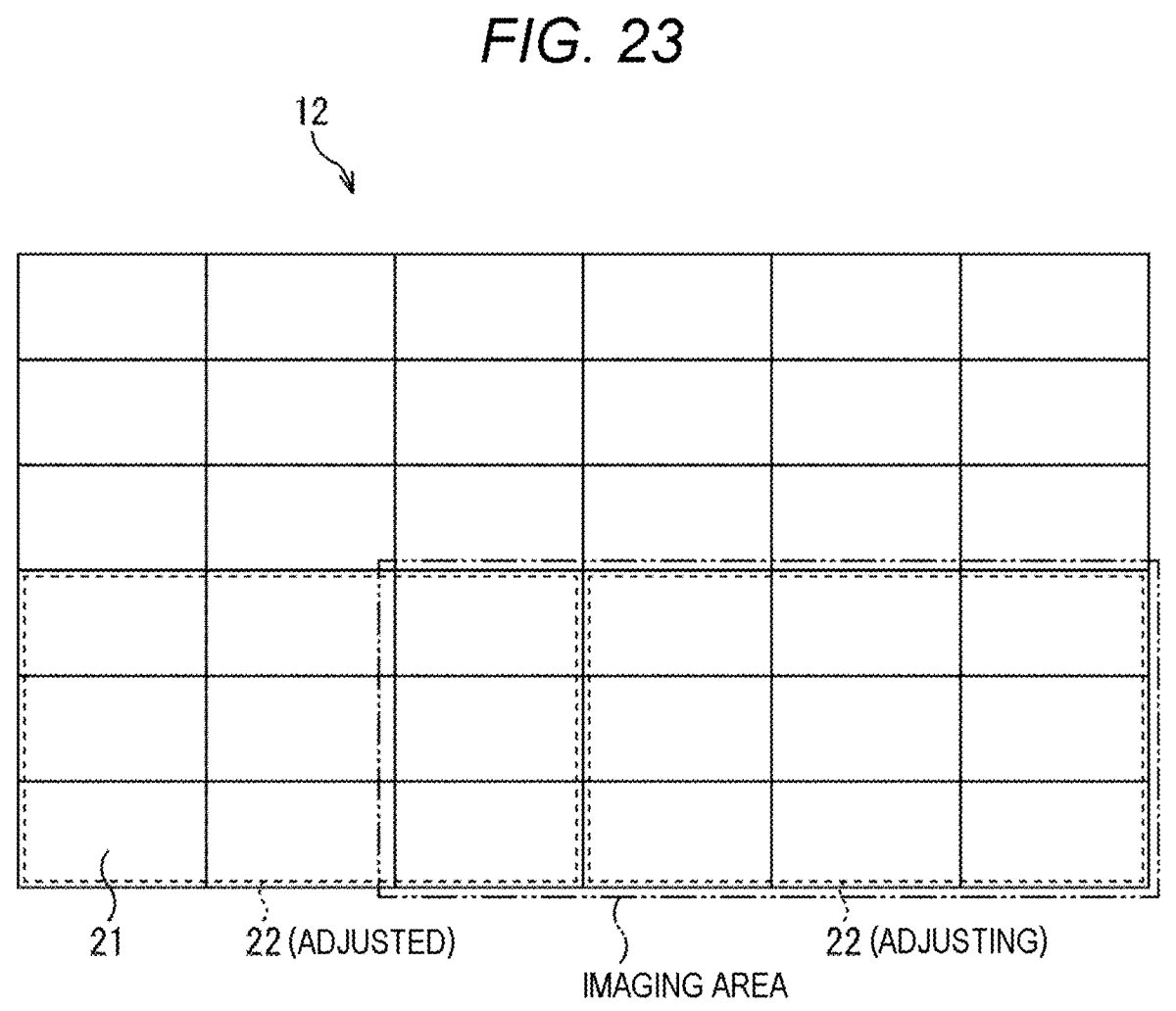

For example, as illustrated in FIG. 23, an example will be described in which the uniformity adjustment processing is performed while setting a cabinet including 3×3 array LED modules 21 as the adjustment target range 22. In the example illustrated in FIG. 23, the 3×3 array LED modules 21 arranged at the lower left of the LED display device 12 serve as an adjusted adjustment target range 22, and the 3×3 array LED modules 21 arranged at the lower right of the LED display device 12 serve as an adjusting adjustment target range 22.

Then, when the uniformity adjustment processing of the adjusting adjustment target range 22 is performed, out of the LED display device 12 forming the adjusted adjustment target range 22, the LED display device 12 adjacent to the adjusting adjustment target range 22 is set as an imaging area to be imaged by the camera 13. In this manner, by imaging so as to overlap a part of the adjusted adjustment target range 22 by the camera 13, it is possible to perform the uniformity adjustment processing so as not to generate a step in luminance at a boundary of the adjustment target range 22 with the adjusted adjustment target range 22 as a reference.

Figure 24A:
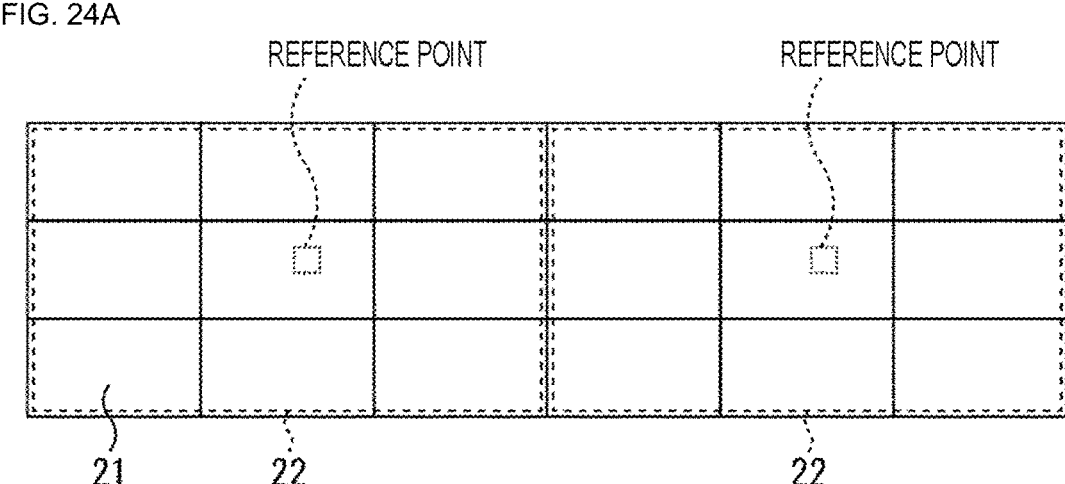
FIGS. 24A and 24B are diagrams illustrating a step in luminance occurring at a boundary with a cabinet.

For example, as illustrated in FIG. 24A, in a case where the imaging is performed by the camera 13 for each adjustment target range 22 without overlapping, the uniformity adjustment processing is performed with the reference point provided in each adjustment target range 22 as a reference. For example, in a case where the luminance of the LED display device 12 serving as the reference point in the adjustment target range 22 on a right side is different from the luminance of the LED display device 12 serving as the reference point in the adjustment target range 22 on a left side, entire luminance of the adjustment target range 22 on the right side and the entire luminance of the adjustment target range 22 on the left side are different after the uniformity adjustment processing is performed. As a result, a step in luminance occurs at the boundary between the cabinet serving as the adjustment target range 22 on the right side and the cabinet serving as the adjustment target range 22 on the left side.

Figure 24B:
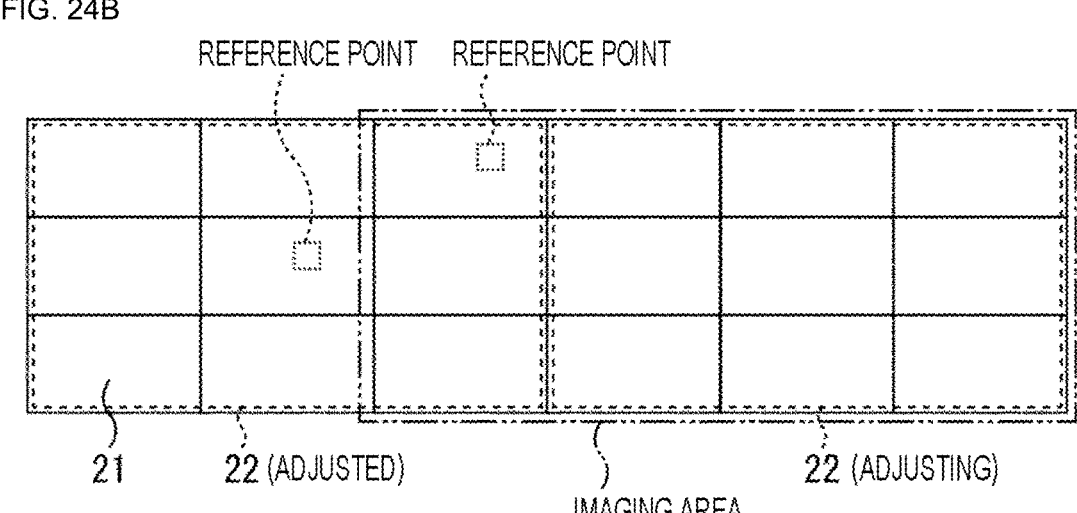

In contrast, as illustrated in FIG. 24B, in a case where the imaging is performed so as to overlap a part of the adjusted adjustment target range 22 by the camera 13, it is possible to provide the reference point in the adjusted adjustment target range 22 and perform the uniformity adjustment processing of the adjusting adjustment target range 22 with the reference point as a reference. Therefore, the luminance of the adjusting adjustment target range 22 can be matched with the luminance of the adjusted adjustment target range 22. As a result, it is possible to avoid the occurrence of a step in luminance at the boundary of the cabinet serving as the adjustment target range 22, and the display system 11 can support the LED display device 12 having a larger size.

As illustrated in FIG. 25A, in a case where the adjusted adjustment target range 22 is arranged adjacent to the adjusting adjustment target range 22 on a left side, the uniformity adjustment processing is performed on the adjusting adjustment target range 22 with the brightness of the LED module 21 serving as a reference in the adjusted adjustment target range 22 as a target for each same row.

As illustrated in FIG. 25B, in a case where the adjusted adjustment target range 22 is arranged adjacent to the adjusting adjustment target range 22 on a lower side, the uniformity adjustment processing is performed on the adjusting adjustment target range 22 with the brightness of the LED module 21 serving as a reference in the adjusted adjustment target range 22 as a target for each same column.

As illustrated in FIG. 25C, in a case where the adjusted adjustment target range 22 is arranged adjacent to the adjusting adjustment target range 22 on a left side and a lower side, the uniformity adjustment processing is performed on the adjusting adjustment target range 22 with brightness weighted and synthesized according to a distance in a row direction and a column direction as a target for each point. That is, by a weighted average obtained by weighting the brightness of the LED module 21 serving as a reference in the adjusted adjustment target range 22 in the row direction according to the distance in the row direction, and weighting the brightness of the LED module 21 serving as a reference in the adjusted adjustment target range 22 in the column direction according to the distance in the column direction, the brightness is synthesized and set as a target.

The LED calibration table used in the uniformity adjustment processing will be described with reference to FIG. 26.

Figure 30A:
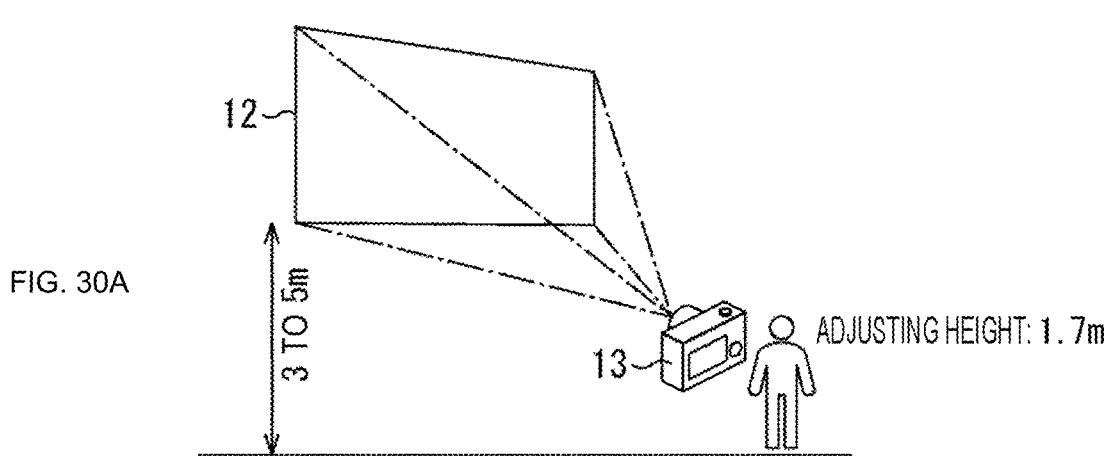
FIGS. 30A, 30B, and 30C are diagrams illustrating a viewing point mode.
Figure 30B:
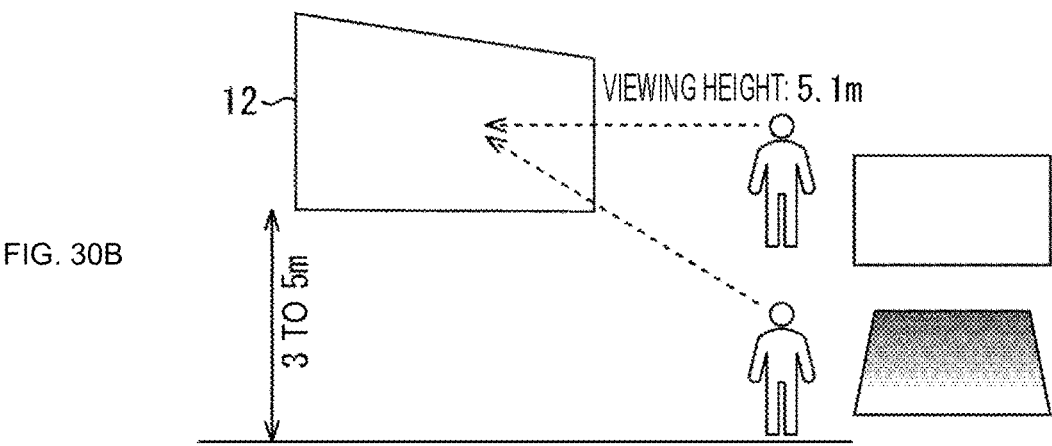
Figure 30C:
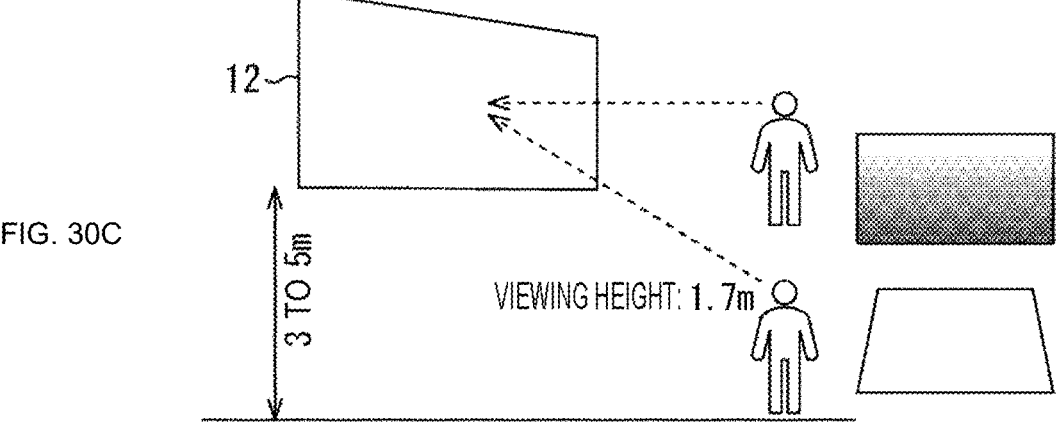

For example, in a case where the LED display device 12 installed in a high place is viewed while looking up as illustrated in FIGS. 30A, 30B, and 30C to be described later, color deviation occurs due to the viewing angle of the LED of each color forming the LED pixel 24 of the LED display device 12. Therefore, assuming a position in which the LED display device 12 is viewed, and the LED calibration table is used when the uniformity adjustment processing is performed so that the color deviation does not occur in the position.

Figure 26:
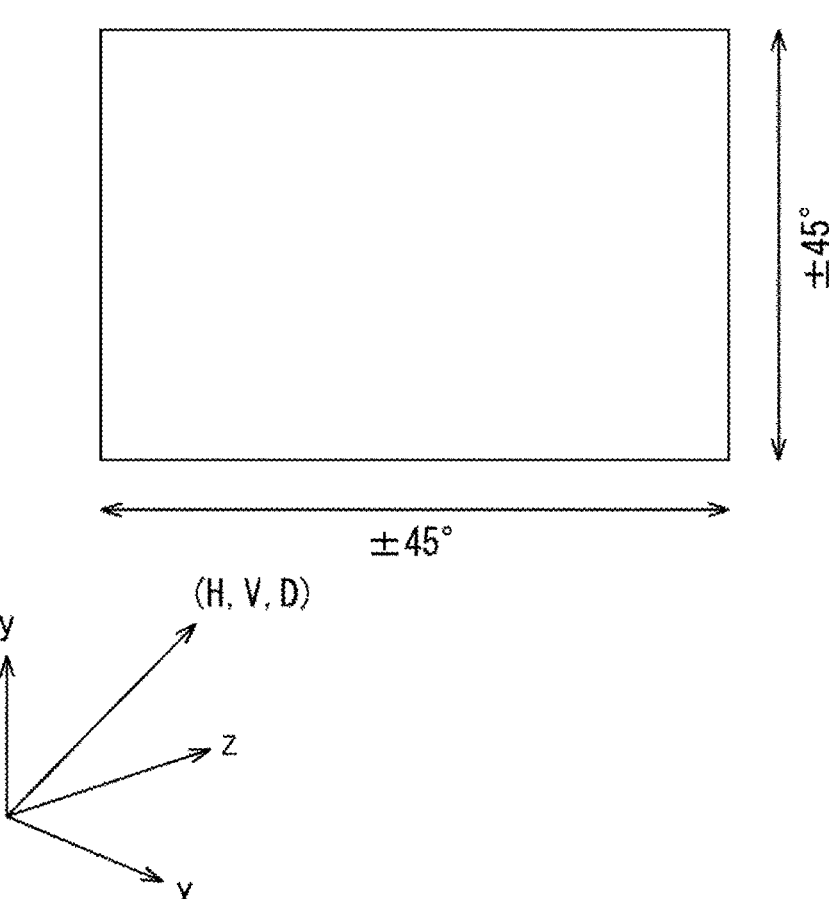
FIG. 26 is a diagram illustrating an LED calibration table.

As illustrated in FIG. 26, the LED calibration table is acquired in a range of ±45° in each of a pan direction and a tilt direction with the installation position of the camera 13 when the uniformity adjustment processing is performed as a reference. For example, in the lens calibration table, a correction coefficient for correcting the color deviation according to the viewing angle of the LED is registered for each of a horizontal angle H, a vertical angle V, and a distance D to the LED display device 12.

<LED Display Device in Round Shape>

The LED display device 12 in a round shape will be described with reference to FIGS. 27 to 29.

In the display system 11, the LED display device 12 can be installed in a round shape by adjusting an angular difference between the adjacent cabinets 17 for each cabinet 17 including a plurality of LED modules 21. Then, by preparing curve information indicating a shape of the LED display device 12 installed in the round shape in advance, this can be used as shape information of the LED display device 12 at the time of positioning of the camera 13 or can be used to acquire the LED calibration table of the adjustment target range 22 in the uniformity adjustment processing.

The curve information of the LED display device 12 installed in the round shape will be described with reference to FIG. 27.

Figure 27:
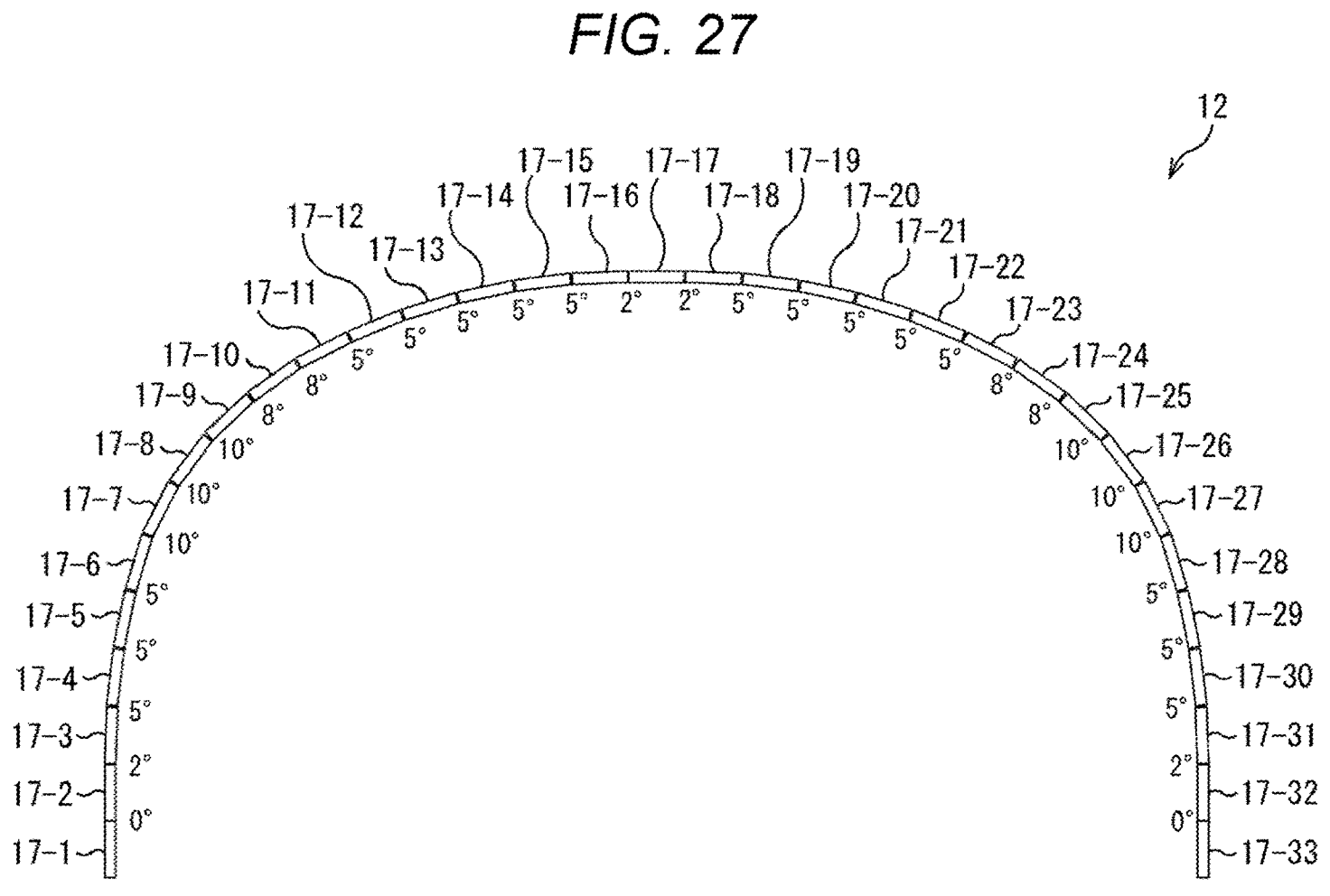

FIG. 27 illustrates a plan view of the LED display device 12 installed in a round shape by arranging 33 cabinets 17 at a predetermined angle between adjacent cabinets 17. Then, a numerical value indicating an angular difference between the adjacent cabinets 17 is registered in the curve information. In the illustrated example, the angular difference between cabinets 17-1 and 17-2 is registered in the curve information as 0°, and the angular difference between cabinets 17-2 and 17-3 is registered in the curve information as 2°. From the cabinet 17-3 to a cabinet 17-6, the angular difference is registered in the curve information as 5°, and from the cabinet 17-6 to a cabinet 17-9, the angular difference is registered in the curve information as 10°. Hereinafter, a numerical value indicating an angular difference between the adjacent cabinets 17 is similarly registered in the curve information.

Figure 28:
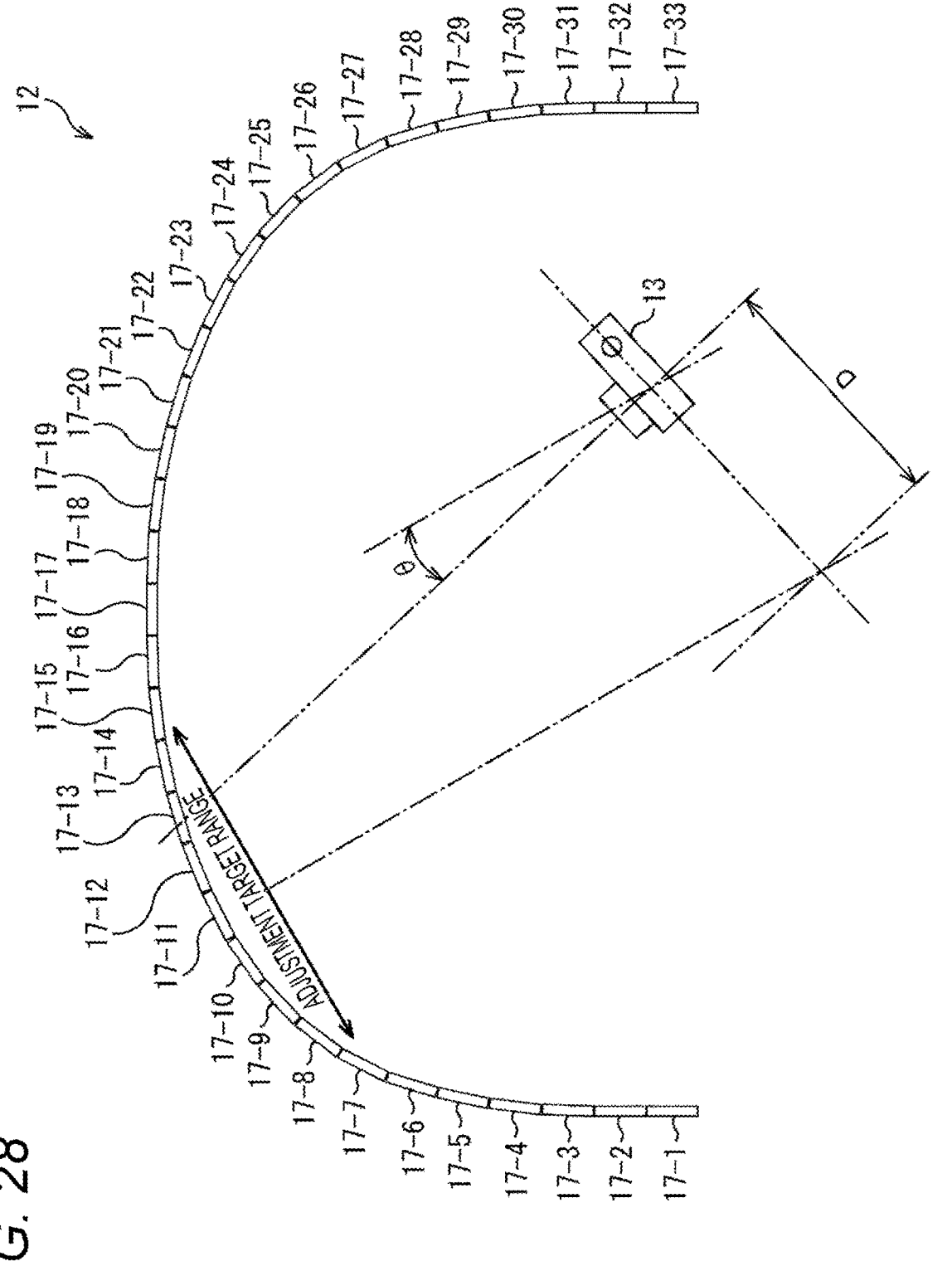
FIG. 28 is a diagram illustrating positioning of a camera with respect to the round shape.

FIG. 28 is a diagram illustrating positioning of the camera 13 installed with respect to the LED display device 12 installed in the round shape.

For example, the posture (pan/tilt/roll, X/Y/Z position) of the camera 13 can be estimated on the basis of the image imaged by the camera 13 and the curve information, which is the shape information of the LED display device 12, and an angle θ toward the front of the adjustment target range and a distance D deviating from the center of the adjustment target range can be obtained. Then, by adjusting the installation position of the camera 13 so that the angle θ and the distance D become 0, the camera 13 can be installed in the position in front and at the center of the adjustment target range.

Furthermore, in the display system 11, since the LED calibration table according to the viewing angle of the LED pixel 24 and the lens calibration table according to the lens used by the camera 13 are separated, the LED calibration table can be accurately applied to the LED display device 12 installed in the round shape. Therefore, for example, it is possible to support a distorted image obtained when the LED display device 12 installed in the round shape is imaged by the camera 13 while looking up.

Figure 29:
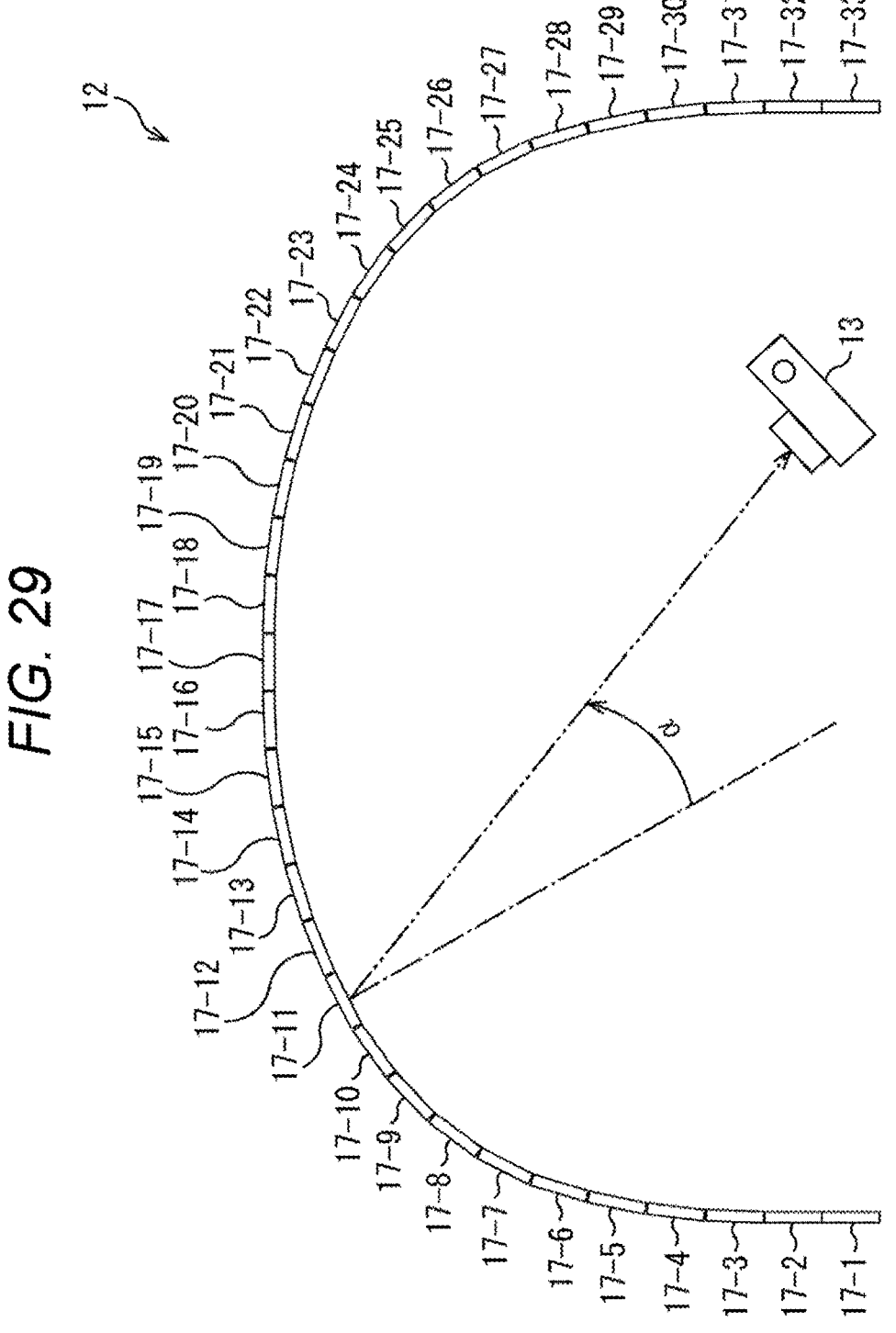
FIG. 29 is a diagram illustrating uniformity adjustment processing for the round shape.

FIG. 29 is a diagram illustrating the uniformity adjustment processing in the LED display device 12 installed in the round shape.

For example, in the display system 11, a viewing angle α of the LED pixel 24 to be measured can be calculated on the basis of the curve information indicating the shape of the LED display device 12 and the camera position information indicating the installation position of the camera 13 with respect to the LED display device 12. The viewing angle α of the LED pixel 24 to be measured is an angle between a straight line (one-dot chain line) that passes through the LED pixel 24 to be measured and goes in a direction perpendicular to the cabinet 17 and a straight line (two-dot chain line) that goes from the LED pixel 24 to be measured to a focal point of the camera 13.

Then, after calculating the viewing angles α of all the LED pixels 24, the display system 11 can acquire brightness data obtained by multiplying the same by the correction coefficient registered in the LED calibration table.

<Viewing Point Mode of Uniformity Adjustment Processing>

A viewing point mode of the uniformity adjustment processing will be described with reference to FIGS. 30A, 30B, and 30C.

In the display system 11, the viewing point mode for adjusting uniformity to be uniform in the position of the camera 13 as the viewing point is set, and the viewing point can be optionally selected according to an installation case of the display system 11.

For example, as illustrated in A of FIG. 30A, an installation case in which the LED display device 12 is installed at the height of 3 to 5 m will be described. As described above with reference to FIG. 20, even if the camera 13 is installed in the position away from the front of the LED display device 12 or the center of the adjustment target range 22, the uniformity adjustment processing can be performed by estimating the posture of the camera 13. That is, the uniformity adjustment processing of the LED display device 12 installed at the height of 3 to 5 m can be performed by the camera 13 installed at the height of 1.7 m, for example.

FIG. 30B illustrates an example of performing the uniformity adjustment processing of the LED display device 12 in a front view mode of installing the camera 13 in the position in front of the LED display device 12 and at the center of the adjustment target range 22.

In a case where the uniformity adjustment processing is performed in the front view mode, if a viewing height at which the LED display device 12 is viewed is the front of the LED display device 12 (for example, viewing height: 5.1 m), it is possible to view the image in which the color deviation does not occur without an influence of the viewing angle of the LED. In contrast, in this case, when the LED display device 12 installed at the height of 3 to 5 m is viewed from the height of 1.7 m, for example, the image in which the color deviation occurs due to the influence of the viewing angle of the LED is viewed on an upper portion of the LED display device 12.

Furthermore, in the front view mode, viewpoint adjustment limited to the vertical direction is performed, thereby supporting a direction in which the LED display device 12 is looked up. For example, in a private theater or the like, it is possible to support viewing at one place applied in the horizontal direction and the vertical direction. Furthermore, a gain may be adjusted by angles in the horizontal direction and the vertical direction to fix.

FIG. 30C illustrates an example of performing the uniformity adjustment processing of the LED display device 12 in the viewing point mode of installing the camera 13 while setting the height of 1.7 m as the viewing point with respect to the LED display device 12 set at the height of 3 to 5 m.

In a case where the uniformity adjustment processing is performed in the viewing point mode, if the viewing height at which the LED display device 12 is viewed is 1.7 m, it is possible to view the image in which the color deviation does not occur without an influence of the viewing angle of the LED. In contrast, in this case, when the LED display device 12 installed at the height of 3 to 5 m is viewed from the front, from the height of 5.1 m, for example, the image in which the color deviation occurs due to the influence of the viewing angle of the LED is viewed on a lower portion of the LED display device 12.

In this manner, by setting the viewing point mode of the uniformity adjustment processing, the display system 11 can support viewing in which color deviation does not occur in the image at the viewing point assumed according to the installation case of the LED display device 12.

Note that, when acquiring the LED calibration table, it is necessary to measure shading data for each viewing angle of the LED pixel 24. At that time, one of the LED module 21 and the camera 13 is fixed, the other is attached to a robot arm, and the robot arm is moved to change a relative angle, whereby the data can be measured. Therefore, for example, it becomes possible to support wavelength swing, and a planar light source is not necessary.

<Configuration Example of Computer>

Next, the series of processing described above can be performed by hardware or also performed by software. In a case where the series of the processing is performed by the software, a program configuring the software is installed on a general-purpose computer and the like.

Figure 31:
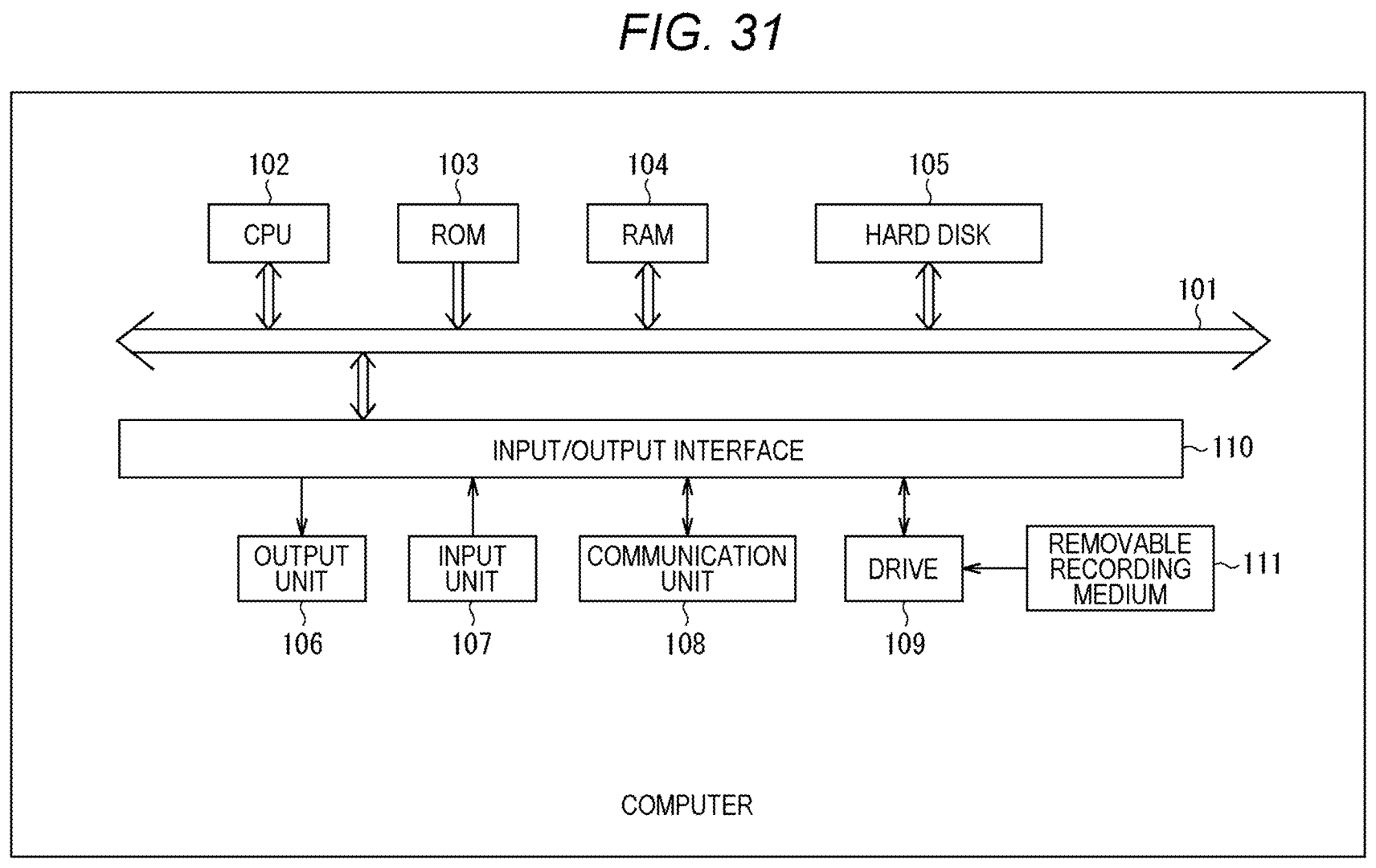

FIG. 31 is a block diagram illustrating a configuration example of one embodiment of a computer in which a program for executing the above-described series of processing is installed.

The program can be recorded in advance on a hard disk 105 or a ROM 103 as a recording medium incorporated in the computer.

Alternatively, the program can also be stored (recorded) in a removable recording medium 111 driven by a drive 109. Such removable recording medium 111 can be provided as so-called package software. Here, examples of the removable recording medium 111 include, for example, a flexible disk, a compact disc read only memory (CD-ROM), a magneto optical (MO) disk, a digital versatile disc (DVD), a magnetic disk, a semiconductor memory and the like.

Note that, in addition to installing on the computer from the removable recording medium 111 as described above, the program can be downloaded to the computer through a communication network or a broadcasting network and installed on the incorporated hard disk 105. That is, for example, the program can be wirelessly transferred from a download site to the computer through an artificial satellite for digital satellite broadcasting, or can be transferred by a wire to the computer through a network such as a local area network (LAN) and the Internet.

The computer incorporates a central processing unit (CPU) 102, and an input/output interface 110 is connected to the CPU 102 through a bus 101.

Upon receiving a command input by a user by operating an input unit 107 and the like through the input/output interface 110, the CPU 102 executes a program stored in the read only memory (ROM) 103 accordingly. Alternatively, the CPU 102 loads a program stored in the hard disk 105 into a random access memory (RAM) 104 to execute.

Therefore, the CPU 102 performs processing according to the flowchart described above or processing to be performed by a configuration in the block diagram described above. Then, as necessary, the CPU 102 outputs a processing result from an output unit 106, or transmits the same from a communication unit 108, and further, records the same on the hard disk 105 and the like, through the input/output interface 110, for example.

Note that, the input unit 107 includes a keyboard, a mouse, a microphone and the like. Furthermore, the output unit 106 includes a liquid crystal display (LCD), a speaker and the like.

Here, in the present specification, the processing to be performed by the computer in accordance with the program is not necessarily performed in time series according to the order described in the flowcharts. That is, the processing to be performed by the computer in accordance with the program includes processing to be executed in parallel or independently (parallel processing or object-based processing, for example).

Furthermore, the program may be processed by one computer (one processor) or processed in a distributed manner by a plurality of computers. Moreover, the program may be transferred to a distant computer to be executed.

Moreover, in the present specification, a system means a set of a plurality of components (devices, modules (parts) and the like), and it does not matter whether or not all the components are in the same housing. Therefore, a plurality of devices housed in separate housings and connected to each other via a network and one device in which a plurality of modules is housed in one housing are both systems.

Furthermore, for example, a configuration described as one device (or one processing unit) may be divided and configured as a plurality of devices (or processing units). Conversely, configurations described above as the plurality of devices (or processing units) may be collectively configured as one device (or processing unit). Furthermore, it goes without saying that a configuration other than the above-described configurations may be added to the configuration of each device (or each processing unit). Moreover, when the configuration and operation as an entire system are substantially the same, a part of the configuration of a certain device (or processing unit) may be included in the configuration of another device (or another processing unit).

Furthermore, for example, the present technology can be configured as cloud computing in which one function is shared and jointly processed by a plurality of devices through the network.

Furthermore, for example, the program described above can be executed by an optional device. In this case, the device is only required to have a necessary function (functional block and the like) and obtain necessary information.

Furthermore, for example, each step described in the flowcharts described above can be executed by one device, or can be executed in a shared manner by a plurality of devices. Moreover, in a case where a plurality of processes is included in one step, the plurality of processes included in one step can be executed by one device or executed in a shared manner by a plurality of devices. In other words, the plurality of processes included in one step can also be executed as processes of a plurality of steps. Conversely, the processes described as the plurality of steps can also be collectively executed as one step.

Note that, in the program executed by the computer, the processes of steps of describing the program may be executed in time series in the order described in the present specification, or may be executed in parallel, or independently at a necessary timing such as when a call is made. That is, unless there is a contradiction, the process of each step may be executed in the order different from the order described above. Moreover, the process of the step of describing the program may be executed in parallel with processes of another program, or may be executed in combination with processes of the other program.

Note that, a plurality of present technologies that has been described in the present specification can each be implemented independently as a single unit unless there is a contradiction. It goes without saying that optional plurality of present technologies can be implemented in combination. For example, a part of or entire present technology described in any of the embodiments can be implemented in combination with a part of or entire present technology described in other embodiments. Furthermore, a part of or entire optional present technology described above can be implemented together with another technology that is not described above.

<Combination Examples of Configurations>

Note that, the present technology can also have the following configurations.

(1)

An information processing system including:

a contrast measurement unit that measures, on the basis of an image obtained by imaging an LED display device configured by arranging a plurality of light emitting diode (LED) modules in a shape of tiles, brightness of a joint area including a boundary between the LED modules adjacent to each other and a background area outside the joint area in the LED display device, and measures contrast of the joint area with respect to the background area; and a joint correction value calculation unit that calculates a joint correction value for adjusting luminance at a boundary between the LED modules on the basis of a measurement result of the contrast.

(2)

The information processing system according to (1) described above, in which the contrast measurement unit measures a plurality of contrasts by changing the brightness of the joint area or the background area at a predetermined ratio, and the joint correction value calculation unit calculates the joint correction value on the basis of a measurement result of the plurality of contrasts.

(3)

The information processing system according to (2) described above, in which the joint correction value calculation unit performs linear interpolation on the plurality of contrasts and calculates a signal level corresponding to the brightness of the joint area at which the contrast becomes zero as the joint correction value.

(4)

The information processing system according to any one of (1) to (3) described above, further including:

a joint coordinate detection unit that detects, as joint coordinates, a position of an area corresponding to predetermined LED pixels including LED pixels of two rows or two columns arranged across the boundary between the LED modules adjacent to each other on the image obtained by imaging the LED display device.

(5)

The information processing system according to (4) described above, in which the joint coordinate detection unit detects the joint coordinates on the basis of an image obtained by imaging the LED display device in a state in which predetermined LED pixels including the LED pixels of two rows or two columns arranged across the boundary between the LED modules adjacent to each other are turned on, and the LED pixels other than the predetermined LED pixels are turned off.

(6)

The information processing system according to (4) described above, further including:

a measurement area detection unit that detects an area corresponding to a measurement area of a predetermined shape including the boundary between the LED modules adjacent to each other on the image obtained by imaging the LED display device.

(7)

The information processing system according to (6) described above, in which the measurement area detection unit detects an area corresponding to the measurement area on the basis of an image obtained by imaging the LED display device in a state in which the LED pixels of the measurement area are turned on and the LED pixels other than the measurement area are turned off.

(8)

The information processing system according to (6) described above, in which the measurement area is provided in the vicinity of both ends of the boundary between the LED modules adjacent to each other.

(9)

The information processing system according to (6) described above, in which the contrast measurement unit detects, on an image obtained by imaging the LED display device that displays a single color screen of a predetermined color, a brightness component of the predetermined color in an area corresponding to the measurement area, the area corresponding to the joint coordinates as the brightness of the joint area, and detects a brightness component of the predetermined color in an area corresponding to the measurement area, the area corresponding to other than the joint coordinates as the brightness of the background area.

(10)

The information processing system according to (9) described above, in which the contrast measurement unit measures the contrast using an image obtained by imaging the LED display device that displays the single color screen in a state in which correction is applied on the basis of the joint correction value, and displays a joint adjustment processing screen that presents a measurement result.

(11)

The information processing system according to (10) described above, in which guide display indicating the boundary at which the contrast is not zero in the measurement area is performed on the joint adjustment processing screen.

(12)

The information processing system according to (10) described above, in which it is determined whether or not it is necessary to readjust the luminance at the boundary between the LED modules on the basis of the measurement result of the contrast.

(13)

The information processing system according to any one of (1) to (12) described above, further including:

a joint correction value setting unit that writes and sets the joint correction value obtained by the joint correction value calculation unit in a storage unit of the LED display device.

(14)

The information processing system according to any one of (1) to (13) described above, further including:

a camera positioning processing unit that performs camera positioning processing for accurately installing a camera that images the LED display device in a position in front of the LED display device and at the center of a target range for which the joint correction value is calculated.

(15)

The information processing system according to (14) described above, in which the camera positioning processing unit accepts designation of the target range and performs the camera positioning processing on the basis of the designated target range.

(16)

The information processing system according to (14) described above, in which the camera positioning processing unit detects, on the basis of an image obtained by imaging the LED display device in a state in which positioning markers are displayed at four corners of the target range, four areas corresponding to the positioning markers on the image, and calculates an adjustment amount for adjusting an angle and a position of the camera for matching with reference position coordinate data of four target markers acquired in advance.

(17)

The information processing system according to (16) described above, in which the camera positioning processing unit displays a camera positioning processing screen provided with a display area for displaying the adjustment amount for adjusting an angle and a position of the camera.

(18)

The information processing system according to any one of (1) to (17) described above, further including:

an external light removal processing unit that performs an arithmetic operation of subtracting an image obtained by imaging the LED display device in a state in which a black image is displayed on an entire surface or in a state in which the entire surface is turned off from an image obtained by imaging the LED display device in a state in which an image of a predetermined color other than black is displayed on an entire surface, thereby acquiring an image in which only the image of a predetermined color of the LED display device remains, and limiting an area corresponding to the image of a predetermined color on the image as a processing target range.

(19)

An adjusting method of an information processing system of performing processing including:

measuring, on the basis of an image obtained by imaging an LED display device configured by arranging a plurality of light emitting diode (LED) modules in a shape of tiles, brightness of a joint area including a boundary between the LED modules adjacent to each other and a background area outside the joint area in the LED display device, and measuring a contrast of the joint area to the background area; and calculating a joint correction value for adjusting luminance at the boundary between the LED modules on the basis of a measurement result of the contrast.

(20)

A program for allowing a computer of an information processing system to execute processing including:

measuring, on the basis of an image obtained by imaging an LED display device configured by arranging a plurality of light emitting diode (LED) modules in a shape of tiles, brightness of a joint area including a boundary between the LED modules adjacent to each other and a background area outside the joint area in the LED display device, and measuring a contrast of the joint area to the background area; and calculating a joint correction value for adjusting luminance at the boundary between the LED modules on the basis of a measurement result of the contrast.

Note that, the present embodiment is not limited to the embodiment described above, and various modifications can be made without departing from the gist of the present disclosure. Furthermore, the effects described in the present specification are merely examples and are not limited, and other effects may be provided.

REFERENCE SIGNS LIST

11 Display system
12 LED display device
13 Camera
14 Information processing device
15 Display controller
16 Illumination device
21 LED module
22 Adjustment target range
23 Marker for positioning
24 LED pixel
25 Hatch area
26 Measurement area
27 Joint area
28 Background area
29 Marker
31 Display control unit
32 Camera control unit
33 Screen display control unit
34 LED display adjustment processing unit
41 Camera positioning processing unit
42 External light removal processing unit
43 Joint adjustment processing unit
44 Uniformity adjustment processing unit
51 Joint coordinate detection unit
52 Measurement area detection unit
53 Contrast measurement unit
54 Joint correction value calculation unit
55 Joint correction value setting unit
61 Marker display unit
62 Single color display unit
63 Luminance data calculation unit 64 Uniformity correction value calculation unit
65 Uniformity correction value setting unit
The invention claimed is:

1. An information processing system, comprising:
a processor configured to:
  perform a contrast measurement process to:
    measure, based on an image obtained by imaging an LED display device configured by an arrangement of a plurality of light emitting diode (LED) modules in a shape of tiles, brightness of a joint area including a boundary between the LED modules adjacent to each other and a background area outside the joint area in the LED display device; and
    measure a contrast of the joint area to the background area;
  perform a joint correction value calculation process to calculate a joint correction value for adjusting luminance at the boundary between the LED modules based on a measurement result of the contrast; and
  perform an external light removal process that includes an arithmetic operation of subtracting an image obtained by imaging the LED display device in a state in which a black image is displayed on an entire surface or in a state in which the entire surface is turned off from an image obtained by imaging the LED display device in a state in which an image of a predetermined color other than black is displayed in a processing target range, thereby acquiring an image in which only the image of a predetermined color of the LED display device remains, and limiting an area corresponding to the image of a predetermined color on the image as a processing target range.

2. The information processing system according to claim 1, wherein the processor is further configured to:
  measure, in the contrast measurement process, a plurality of contrasts by changing the brightness of the joint area or the background area at a predetermined ratio; and
  calculate, in the joint correction value calculation process, the joint correction value on a basis of a measurement result of the plurality of contrasts.

3. The information processing system according to claim 2, wherein the processor, in the joint correction value calculation process, is further configured to:
  perform linear interpolation on the plurality of contrasts; and
  calculate a signal level corresponding to the brightness of the joint area at which the contrast is zero as the joint correction value.

4. The information processing system according to claim 1, wherein the processor is further configured to perform a joint coordinate detection process to detect, as joint coordinates, a position of an area corresponding to predetermined LED pixels including LED pixels of two rows or two columns arranged across the boundary between the LED modules adjacent to each other on the image obtained by imaging the LED display device.

5. The information processing system according to claim 4, wherein the processor in, the joint coordinate detection process, is further configured to detect the joint coordinates based on an image obtained by imaging the LED display device in a state in which predetermined LED pixels including the LED pixels of two rows or two columns arranged across the boundary between the LED modules adjacent to each other are turned on, and the LED pixels other than the predetermined LED pixels are turned off.

6. The information processing system according to claim 4, wherein the processor is further configured to perform a measurement area detection process to detect an area corresponding to a measurement area of a predetermined shape including the boundary between the LED modules adjacent to each other on the image obtained by imaging the LED display device.

7. The information processing system according to claim 6, wherein the processor, in the measurement area detection process, is further configured to detect an area corresponding to the measurement area based on an image obtained by imaging the LED display device in a state in which the LED pixels of the measurement area are turned on and the LED pixels other than the measurement area are turned off.

8. The information processing system according to claim 6, wherein the measurement area is provided in a vicinity of both ends of the boundary between the LED modules adjacent to each other.

9. The information processing system according to claim 6, wherein the processor, in the contrast measurement process, is further configured to:
  detect, on an image obtained by imaging the LED display device that displays a single color screen of a predetermined color, a brightness component of the predetermined color in an area corresponding to the measurement area, the area corresponding to the joint coordinates as the brightness of the joint area; and
  detect a brightness component of the predetermined color in an area corresponding to the measurement area, the area corresponding to other than the joint coordinates as the brightness of the background area.

10. The information processing system according to claim 9, wherein the processor in the contrast measurement process is further configured to:
  measure the contrast using an image obtained by imaging the LED display device that displays the single color screen in a state in which correction is applied on a basis of the joint correction value; and
  display a joint adjustment processing screen that presents a measurement result.

11. The information processing system according to claim 10, wherein guide display, that indicates the boundary at which the contrast is not zero in the measurement area, is performed on the joint adjustment processing screen.

12. The information processing system according to claim 10, wherein it is determined whether or not it is necessary to readjust the luminance at the boundary between the LED modules based on the measurement result of the contrast.

13. The information processing system according to claim 1, wherein the processor is further configured to perform a joint correction value setting process to write and set the joint correction value obtained by the joint correction value calculation process in a storage unit of the LED display device.

14. The information processing system according to claim 1, wherein the processor is further configured to perform a camera positioning process to accurately install a camera that images the LED display device in a position in front of the LED display device and at a center of a target range for which the joint correction value is calculated.

15. The information processing system according to claim 14, wherein
  the processor in the camera positioning process, is further configured to accept designation of the target range, and
  the camera positioning process is based on the designated target range.

16. The information processing system according to claim 14, wherein the processor, in the camera positioning process, is further configured to:

detect based on an image obtained by imaging the LED display device in a state in which positioning markers are displayed at four corners of the target range, four areas corresponding to the positioning markers on the image; and calculate an adjustment amount for adjusting an angle and a position of the camera for matching with reference position coordinate data of four target markers acquired in advance.

17. The information processing system according to claim 16, wherein the processor, in the camera positioning process, is further configured to display a camera positioning process screen provided with a display area for displaying the adjustment amount for adjusting an angle and a position of the camera.

18. An adjusting method, comprising:

in an information processing system:

performing a contrast measurement process to:

measure, based on an image obtained by imaging an LED display device configured by arranging a plurality of light emitting diode (LED) modules in a shape of tiles, brightness of a joint area including a boundary between the LED modules adjacent to each other and a background area outside the joint area in the LED display device; and measure a contrast of the joint area to the background area;

performing a joint correction value calculation process to calculate a joint correction value for adjusting luminance at the boundary between the LED modules on a basis of a measurement result of the contrast; and performing an external light removal process that includes an arithmetic operation of subtracting an image obtained by imaging the LED display device in a state in which a black image is displayed on an entire surface or in a state in which the entire surface is turned off from an image obtained by imaging the LED display device in a state in which an image of a predetermined color other than black is displayed in a processing target range, thereby acquiring an image in which only the image of a predetermined color of the LED display device remains, and limiting an area corresponding to the image of a predetermined color on the image as a processing target range.

19. A non-transitory computer-readable storage medium having stored thereon, computer-executable instructions which, when executed by a computer, cause the computer to execute operations, the operations comprising:

performing a contrast measurement process to:

measure, based on an image obtained by imaging an LED display device configured by arranging a plurality of light emitting diode (LED) modules in a shape of tiles, brightness of a joint area including a boundary between the LED modules adjacent to each other and a background area outside the joint area in the LED display device; and measure a contrast of the joint area to the background area;

performing a joint correction value calculation process to calculate a joint correction value for adjusting luminance at the boundary between the LED modules on a basis of a measurement result of the contrast; and performing an external light removal process that includes an arithmetic operation of subtracting an image obtained by imaging the LED display device in a state in which a black image is displayed on an entire surface or in a state in which the entire surface is turned off from an image obtained by imaging the LED display device in a state in which an image of a predetermined color other than black is displayed in a processing target range, thereby acquiring an image in which only the image of a predetermined color of the LED display device remains, and limiting an area corresponding to the image of a predetermined color on the image as a processing target range.

* * * * *